United States Patent
Yokogi et al.

(10) Patent No.: US 9,353,215 B2
(45) Date of Patent: May 31, 2016

(54) PRODUCTION METHOD OF POLYCARBONATE RESIN

(71) Applicant: MITSUBISHI CHEMICAL CORPORATION, Chiyoda-ku (JP)

(72) Inventors: Masashi Yokogi, Fukuoka (JP); Shingo Namiki, Fukuoka (JP); Takehito Nagao, Fukuoka (JP); Masanori Yamamoto, Fukuoka (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 14/041,397

(22) Filed: Sep. 30, 2013

(65) Prior Publication Data

US 2014/0030505 A1 Jan. 30, 2014

Related U.S. Application Data

(63) Continuation of application No. PCT/JP2012/058740, filed on Mar. 30, 2012.

(30) Foreign Application Priority Data

Mar. 31, 2011 (JP) ................................. 2011-077550
Mar. 31, 2011 (JP) ................................. 2011-077580

(51) Int. Cl.
*B32B 1/02* (2006.01)
*C08G 64/08* (2006.01)
(Continued)

(52) U.S. Cl.
CPC ................ *C08G 64/083* (2013.01); *B29B 9/06* (2013.01); *B29C 47/364* (2013.01);
(Continued)

(58) Field of Classification Search
CPC . C08G 64/04; B29K 2069/00; B29K 2869/00

USPC .......................................................... 264/141
See application file for complete search history.

(56) References Cited

U.S. PATENT DOCUMENTS 4,265,852 A * 5/1981 Sauer ............................ 264/512
8,481,625 B2 7/2013 Yokogi et al.
(Continued)

FOREIGN PATENT DOCUMENTS

EP 2 371 877 10/2011
JP 05-239333 9/1993
(Continued)

OTHER PUBLICATIONS

Partial machine translation of JP 2010-058410, retrieved May 6, 2015.*

(Continued)

*Primary Examiner* — Timothy Kennedy
(74) *Attorney, Agent, or Firm* — Oblon, McClelland, Maier & Neustadt, L.L.P

(57) ABSTRACT

The present invention is a method for producing a polycarbonate resin, comprising performing polycondensation through a transesterification reaction by using a catalyst and using a dihydroxy compound and a carbonic acid diester as raw material monomers, and feeding the produced polycarbonate resin to an extruder, wherein the dihydroxy compound contains at least a dihydroxy compound having a moiety represented by formula (1) in a part of the structure, the dihydroxy compound having a moiety represented by formula (1) contains a compound having a cyclic ether structure, and the temperature at the time of feeding the polycarbonate resin to the extruder is from 180° C. to less than 250° C., with the proviso excluding the case where the moiety represented by formula (1) is a part of —$CH_2$—O—H $$-\!\!\!-\!CH_2\!\!-\!\!O-\!\!\!-\qquad\qquad(1).$$

17 Claims, 1 Drawing Sheet

(51) Int. Cl.
  *C08G 64/30* (2006.01)
  *C08J 5/18* (2006.01)
  *C08G 64/38* (2006.01)
  *B29B 9/06* (2006.01)
  *B29C 47/36* (2006.01)
  *B29C 47/38* (2006.01)
  *B29C 47/60* (2006.01)

(52) U.S. Cl.
  CPC .......... *B29C 47/385* (2013.01); *B29C 47/6056* (2013.01); *C08G 64/305* (2013.01); *C08G 64/38* (2013.01); *C08J 5/18* (2013.01); *C08J 2369/00* (2013.01)

(56) References Cited

U.S. PATENT DOCUMENTS

| | | |
|---|---|---|
| 2011/0003101 A1 | 1/2011 | Fuji et al. |
| 2011/0034646 A1 | 2/2011 | Fuji et al. |
| 2012/0328855 A1 | 12/2012 | Yokogi et al. |
| 2013/0075480 A1 | 3/2013 | Yokogi et al. |
| 2013/0116365 A1 | 5/2013 | Yokogi et al. |
| 2013/0131271 A1 | 5/2013 | Yokogi et al. |
| 2013/0237649 A1 | 9/2013 | Yokogi et al. |
| 2014/0030505 A1 | 1/2014 | Yokogi et al. |

FOREIGN PATENT DOCUMENTS

| | | |
|---|---|---|
| JP | 2006-028441 | 2/2006 |
| JP | 2006-232897 | 9/2006 |
| JP | 2008-024919 | 2/2008 |
| JP | 2008-247953 | 10/2008 |
| JP | 2009-091404 | 4/2009 |
| JP | 2009-091417 | 4/2009 |
| JP | 2009-161745 | 7/2009 |
| JP | 2010-058410 | 3/2010 |
| JP | A-2010-150539 | 7/2010 |
| JP | 2010-189581 | 9/2010 |
| JP | 2011-001454 | 1/2011 |
| JP | 2011-006553 | 1/2011 |
| JP | 2011-21171 | 2/2011 |
| JP | A-2012-046628 | 3/2012 |
| WO | 2004/111106 | 12/2004 |
| WO | 2008/120493 | 10/2008 |

OTHER PUBLICATIONS

Machine translation of JP 2010-189581, retrieved May 6, 2015.*
International Search Report issued Jul. 3, 2012 in PCT/JP2012/058740 filed Mar. 30, 2012.
Office Action in Japanese Patent Application 2012-076256, Sep. 15, 2015. (w/English Translation).
Office Action in corresponding Japanese Patent Application No. 2012-076262, dated Sep. 29, 2015. (w/English translation).
Office Action issued on Jan. 5. 2016 in the corresponding European patent application No. 12765859.9.
Office Action in corresponding Japanese Application No. 2012-076256 dated Feb. 2, 2016. (w/English Translation).

* cited by examiner

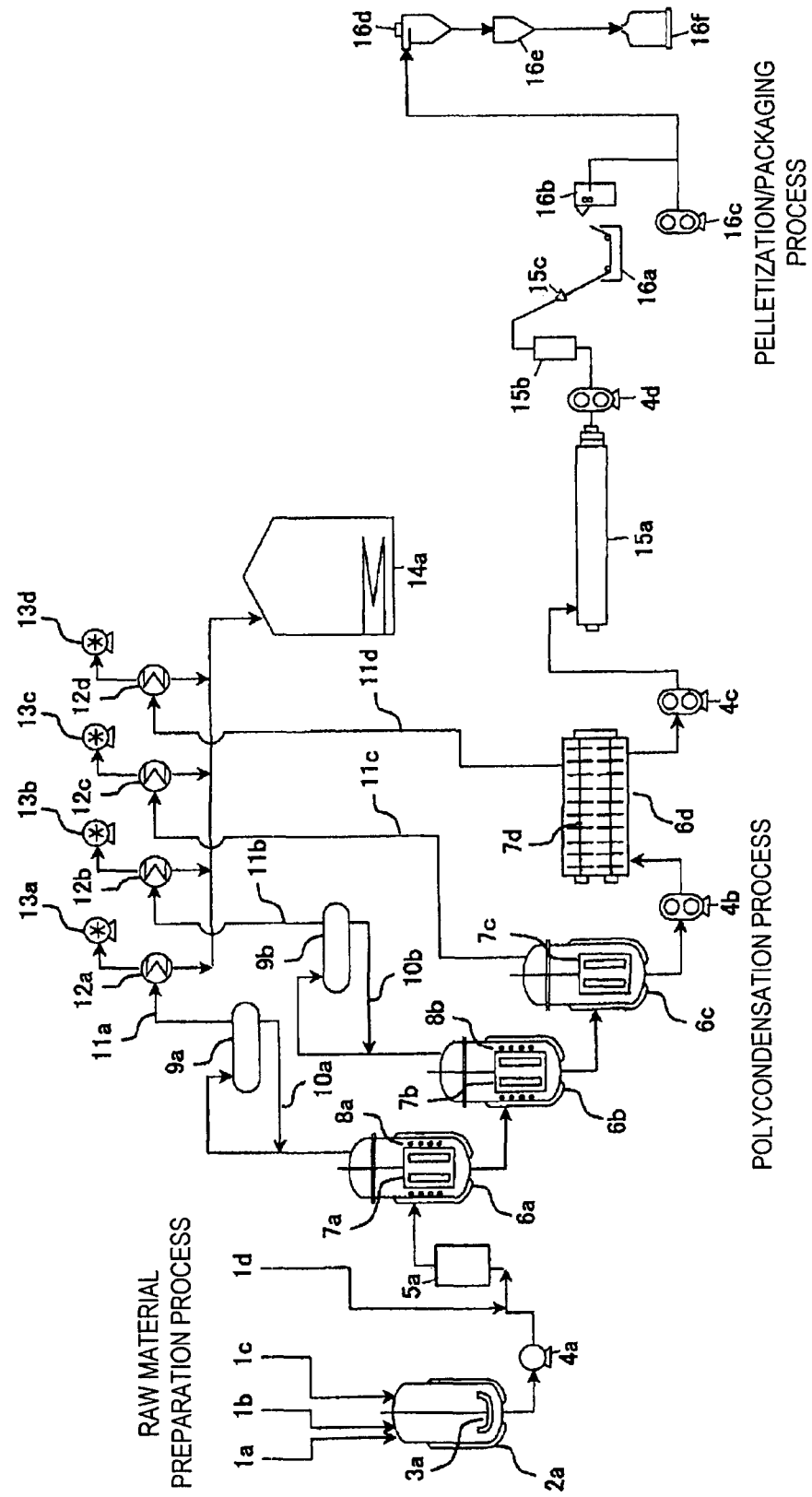

PRODUCTION METHOD OF POLYCARBONATE RESIN

The present invention relates to a method for efficiently and stably producing a polycarbonate resin excellent in the thermal stability, hue and mechanical strength and less contaminated with an extraneous matter.

BACKGROUND ART

A polycarbonate resin is generally produced using bisphenols as a monomer ingredient and by making use of its superiority such as transparency, heat resistance and mechanical strength, is widely utilized as a so-called engineering plastic in the fields of electric•electronic parts, automotive parts, optical recording mediums, optics such as lens, and the like. However, in the application to an optical compensation film of, for example, a flat panel display that is rapidly spreading in recent years, higher optical characteristics such as low birefringence and low photoelastic coefficient are required, and the conventional polycarbonate resin using bisphenols as a monomer ingredient becomes incapable of meeting the requirement.

Also, the conventional polycarbonate resin is produced using a raw material derived from petroleum resources, but in recent years, depletion of petroleum resources is feared, and it is demanded to provide a polycarbonate resin using a raw material obtained from biomass resources such as plant. In addition, because of a concern that global warming due to increase or accumulation of carbon dioxide emissions may bring about climate change or the like, development of a polycarbonate resin using a plant-derived monomer as a raw material and being carbon neutral even when discarded after use is demanded.

Under these circumstances, a method for obtaining a polycarbonate resin by using, as a monomer ingredient, a special dihydroxy compound and allowing transesterification with a carbonic acid diester to proceed while removing a byproduct monohydroxy compound by distillation under reduced pressure, has been proposed (see, for example, Patent Documents 1 to 6).

The polycarbonate resin is required to be provided, before its formation into product pellets, with a performance according to the application of the final product, for example, by adding/dispersing a catalyst deactivator to stop the progress of polymerization, removing a volatile ingredient such as residual monomer under reduced pressure, or adding/dispersing an additive such as heat stabilizer and release agent, and in the case of the conventional polycarbonate resin using bisphenol A as a monomer ingredient, it has been proposed to perform such an operation by using an extruder (see, for example, Patent Document 7).

BACKGROUND ART DOCUMENT

Patent Document

Patent Document 1: International Publication No. 2004/111106
Patent Document 2: JP-A-2006-232897 (the term "JP-A" as used herein means an "unexamined published Japanese patent application")
Patent Document 3: JP-A-2006-28441
Patent Document 4: JP-A-2008-24919
Patent Document 5: JP-A-2009-91404
Patent Document 6: JP-A-2009-91417
Patent Document 7: JP-A-5-239333

SUMMARY OF INVENTION

Problem that Invention is to Solve

However, the polycarbonate resin using, as a monomer ingredient, a special dihydroxy compound except for bisphenols starts decomposing at a low temperature as compared with the conventional polycarbonate resin using bisphenols as a monomer ingredient and therefore, when the resin is fed to an extruder under the same temperature condition as the conventional condition so as to remove a low molecular weight ingredient or be mixed with an additive, this is associated with a problem that the resin may deteriorate due to shear heat generation during extrusion, hue may be impaired, or gas cutting of a strand by a decomposed gas may occur, making it impossible to stably achieve pelletization.

On the other hand, when the feed temperature of resin is lowered so as to prevent such deterioration of the resin or worsening of the hue or when the heater temperature of the extruder is set excessively low for the same purpose, there is caused a problem that the melt viscosity of the polycarbonate resin is increased and the load of the extruder becomes large to make the extrusion operation unstable or the extruder stops due to an overload.

In order to decrease the melt viscosity of the polycarbonate resin and thereby solve such a problem, the molecular weight of the polycarbonate resin itself must be reduced or the temperature during extrusion must be raised, but there is a problem that reduction in the molecular weight leads to reduction in the mechanical strength or heat resistance and when the temperature during extrusion is raised, not only the resin may decompose or deteriorate, failing in obtaining a resin satisfying physical properties such as mechanical strength, but also coloration may be encouraged or gas cutting of a strand by a decomposed gas may occur, making it impossible to stably obtain pellets.

An object of the present invention is to solve those conventional problems and provide a method for efficiently and stably producing a polycarbonate resin excellent in the thermal stability, hue and mechanical strength.

Means for Solving Problems

As a result of a number of intensive studies so as to attain the above-described object, the present inventors have found that in a method for producing a polycarbonate resin by polycondensation through a transesterification reaction using a catalyst and using a specific dihydroxy compound and a carbonic acid diester as raw material monomers, when the obtained polycarbonate resin is fed to an extruder at a specific temperature, preferably, when the polycarbonate resin fed to the extruder has a specific glass transition temperature, a polycarbonate resin excellent in the mechanical strength and hue can be stably produced.

Also, it is found that since the glass transition temperature of the polycarbonate resin obtained via an extruder is substantially the same as the glass transition temperature of the polycarbonate resin fed to the extruder, when feed of the polycarbonate resin to an extruder is performed at a specific temperature and at the same time, the glass transition temperature of the polycarbonate resin obtained via the extruder falls in a specific range, a polycarbonate resin excellent in the mechanical strength and hue can be stably produced, similarly to the above.

Furthermore, it has been found that in a method for producing a polycarbonate resin by polycondensation through a transesterification reaction using a catalyst and using a specific dihydroxy compound and a carbonic acid diester as raw material monomers, a polycarbonate resin excellent in the mechanical strength and hue can be also stably produced by feeding the obtained polycarbonate resin to an extruder having a barrel with a heater set to a specific temperature.

That is, the gist of the present invention resides in the following items [1] to [21].

[1] A method for producing a polycarbonate resin, comprising performing polycondensation through a transesterification reaction by using a catalyst and using a dihydroxy compound and a carbonic acid diester as raw material monomers, and feeding the produced polycarbonate resin to an extruder, wherein said dihydroxy compound contains a dihydroxy compound having a moiety represented by the following formula (1) in a part of the structure, the dihydroxy compound having a moiety represented by the following formula (1) contains a compound having a cyclic ether structure, and the temperature at the time of feeding said polycarbonate resin to said extruder is from 180° C. to less than 250° C.:

[Chem. 1]

(1)

(with the proviso excluding the case where the moiety represented by formula (1) is a part of —CH$_2$—O—H).

[2] The method for producing a polycarbonate resin as described in the above [1], wherein the glass transition temperature of the polycarbonate resin obtained via said extruder is from 80° C. to less than 145° C.

[3] The method for producing a polycarbonate resin as described in the above [1] or [2], wherein the barrel constituting said extruder has a plurality of heaters and at least one heater out of these heaters is set to a temperature of 100° C. to less than 250° C.

[4] The method for producing a polycarbonate resin as described in the above [3], wherein all of said heaters are set to a temperature of 100° C. to less than 250° C.

[5] The method for producing a polycarbonate resin as described in the above [3] or [4], wherein said heater is set to a temperature not higher than the preset temperature of the heater adjacent to the polycarbonate resin feed side of said extruder.

[6] The method for producing a polycarbonate resin as described in any one of the above [1] to [5], wherein said polycarbonate resin produced by polycondensation through a transesterification reaction is fed in a molten state to said extruder.

[7] The method for producing a polycarbonate resin as described in any one of the above [1] to [6], wherein the screw of said extruder is composed of a plurality of elements, at least one of said elements is a kneading disc, and the total length of said kneading disc is 20% or less of the length of said screw as a whole.

[8] The method for producing a polycarbonate resin as described in any one of the above [1] to [7], wherein assuming that the weight of the resin extruded per hour from said extruder is W (kg/h) and the cross-sectional area of the barrel of said extruder is S (m$^2$), the following formula (5) is satisfied:

$$12000 \leq W/S \leq 60000 \quad (5)$$

[9] The method for producing a polycarbonate resin as described in any one of the above [1] to [8], wherein the reduced viscosity ($\eta_{sp}$/c) of said polycarbonate resin obtained via said extruder, as measured in methylene chloride under the conditions of a concentration of 0.6 g/dL and a temperature of 20.0° C.±0.1° C., is from 0.3 to 1.2 dL/g.

[10] The method for producing a polycarbonate resin as described in any one of the above [1] to [9], wherein the glass transition temperature of the polycarbonate resin obtained via said extruder is from 90 to 140° C.

[11] The method for producing a polycarbonate resin as described in any one of the above [1] to [10], wherein the content of an aromatic monohydroxy compound contained in said polycarbonate resin obtained via said extruder is less than 0.1 wt %.

[12] The method for producing a polycarbonate resin as described in any one of the above [1] to [11], wherein the raw material monomers are filtered through a filter for raw material filtration before polycondensation.

[13] The method for producing a polycarbonate resin as described in any one of the above [1] to [12], wherein an operation of kneading a heat stabilizer is performed using said extruder.

[14] The method for producing a polycarbonate resin as described in any one of the above [1] to [13], wherein said catalyst is a compound of at least one metal selected from the group consisting of metals belonging to Group 2 of the long-form periodic table and lithium.

[15] The method for producing a polycarbonate resin as described in any one of the above [1] to [14], wherein the dihydroxy compound having a moiety represented by formula (1) is isosorbide.

[16] The method for producing a polycarbonate resin as described in any one of the above [1] to [15], wherein an alicyclic dihydroxy compound is further used as said dihydroxy compound.

[17] A polycarbonate resin having a yellow index value of 30 or less, obtained by the production method described in any one of the above [1] to [16].

[18] A polycarbonate resin obtained by the production method described in any one of the above [1] to [16] or the polycarbonate resin described in the above [17], wherein when said resin is molded into a film having a thickness of 35 μm±5 μm, the number of extraneous matters having a maximum length of 25 μm or more contained in said film is 100 pieces/m$^2$ or less.

[19] A polycarbonate resin film having a thickness of 20 to 200 μM, obtained by molding the polycarbonate resin described in the above [17] or [18].

[20] A method for producing a polycarbonate resin pellet, comprising performing polycondensation through a transesterification reaction by using a catalyst and using a dihydroxy compound and a carbonic acid diester as raw material monomers, and feeding the produced polycarbonate resin to an extruder, wherein said dihydroxy compound contains at least a dihydroxy compound having a moiety represented by the following formula (1) in a part of the structure, the glass transition temperature of the polycarbonate resin fed to said extruder is from 80° C. to less than 145° C., and the temperature at the time of feeding said polycarbonate resin to said extruder is from 180° C. to less than 250° C.:

[Chem. 2]

(1)

(with the proviso excluding the case where the moiety represented by formula (1) is a part of —CH$_2$—O—H).

[21] A method for producing a polycarbonate resin, comprising performing polycondensation through a transesterification reaction by using a catalyst and using a dihydroxy compound and a carbonic acid diester as raw material monomers, and feeding the produced polycarbonate resin to an extruder, wherein said dihydroxy compound contains at least a dihydroxy compound having a moiety represented by the following formula (1) in a part of the structure, the dihydroxy compound having a moiety represented by formula (1) is a compound having a cyclic ether structure, the barrel constituting said extruder has a plurality of heaters, and at least one heater out of these heaters is set to a temperature of 100° C. to less than 250° C.:

[Chem. 3]

(1)

(with the proviso excluding the case where the moiety represented by formula (1) is a part of —$CH_2$—O—H).

Effects of Invention

According to the present invention, a polycarbonate resin being excellent in the mechanical strength and hue and less contaminated with an extraneous matter and having performances applicable to a wide range of fields including the field of injection molding such as electric/electronic parts and automotive parts, the field of films and sheets, the field of bottles and containers, and the application in a lens such as camera lens, finder lens and CCD or CMOS lens, in a film or sheet used for a liquid crystal or plasma display or the like, such as retardation film, diffusion sheet and polarizing film, in an optical disk, in an optical material, in an optical part, and in a binder for fixing a coloring matter, a charge transfer agent or the like, can be efficiently and stably produced.

BRIEF DESCRIPTION OF DRAWINGS

FIG. 1 is a process chart showing the production process according to the present invention.

MODE FOR CARRYING OUT INVENTION

The mode for carrying out the present invention is described in detail below, but the constituent requirements described below are an example (representative example) of the embodiment of the present invention, and the present invention is not limited to the following contents as long as its gist is observed.

Incidentally, the expression "mass %", "ppm by mass", and "parts by mass" have the same meanings as "wt %", "ppm by weight" and "parts by weight", respectively. Also, when simply referred to as "ppm", this indicates "ppm by weight".

The method for producing a polycarbonate resin of the present invention is a method for producing a polycarbonate resin, comprising performing polycondensation through a transesterification reaction by using a catalyst and using a dihydroxy compound and a carbonic acid diester as raw material monomers, and feeding the produced polycarbonate resin at a specific temperature to an extruder. More specifically, the production method is characterized in that the dihydroxy compound contains at least a dihydroxy compound having a moiety represented by the following formula (1) in a part of the structure, the dihydroxy compound having a moiety represented by the following formula (1) contains a compound having a cyclic ether structure, and the temperature during feeding to the extruder is from 180° C. to less than 250° C.

Preferably the glass transition temperature of at least either one of the polycarbonate resin fed to the extruder and the polycarbonate resin obtained via the extruder is from 80° C. to less than 145° C. Thanks to this configuration, the above-described object is attained.

Also, the method for producing a polycarbonate resin pellet of the present invention is a method for producing a polycarbonate resin, comprising performing polycondensation through a transesterification reaction by using a catalyst and using a dihydroxy compound and a carbonic acid diester as raw material monomers, and feeding the produced polycarbonate resin to an extruder set to a specific temperature. More specifically, the dihydroxy compound contains at least a dihydroxy compound having a moiety represented by the following formula (1) in a part of the structure, the dihydroxy compound having a moiety represented by formula (1) contains a compound having a cyclic ether structure, and at least one heater out of heaters of the extruder is set to a temperature of 100° C. to less than 250° C. Thanks to this configuration, the above-described object is attained.

[Chem. 4]

(1)

(with the proviso excluding the case where the moiety represented by formula (1) is a part of —$CH_2$—O—H).

<Raw Material Monomers and Polymerization Catalyst>
(Dihydroxy Compound)

The method for producing a polycarbonate resin of the present invention uses a carbonic acid diester and a dihydroxy compound as raw material monomers and is characterized in that at least one dihydroxy compound is a specific dihydroxy compound having a moiety represented by formula (1) in a part of the structure (hereinafter, sometimes referred to as "dihydroxy compound of the present invention"). Furthermore, the dihydroxy compound contains a compound having a cyclic ether structure. The dihydroxy compound as used in the present invention indicates a compound having two hydroxyl groups and further containing at least a structural unit of formula (1).

The dihydroxy compound of the present invention is not particularly limited as long as it has a moiety represented by formula (1) in a part of the structure, but specific examples thereof include oxyalkylene glycols such as diethylene glycol, triethylene glycol, tetraethylene glycol, polyethylene glycol, polypropylene glycol and polytetramethylene glycol; a compound having, on the side chain, an aromatic group and having, on the main chain, an ether group bonded to the aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene and 9,9-bis(4-(3-hydroxy-2,2-dimethylpropoxy)phenyl)fluorene; and a compound having a cyclic ether structure, such as anhydrous sugar alcohol typified by a dihydroxy compound represented by the following formula (2), and a spiroglycol represented by the following formula (3). Among these, in view of heat resistance, giving of phase difference by stretching, and low photoelastic coefficient, isosorbide and a compound having a cyclic ether structure, such as spiroglycol, are preferred, and a compound having two cyclic ether structures is more preferred. On the other hand, in view of availability, handling, reactivity at the polymerization, hue of the obtained polycarbonate resin, and addition of toughness when molded into a film, diethylene glycol, triethylene glycol and polyethylene glycol are preferred. In the present invention, a compound having a cyclic ether structure is contained as the dihydroxy compound of the present invention, and this configuration provides, as described above, a benefit such as heat resistance and giving of phase difference by stretching. Above all, in view of heat resistance, an anhydrous sugar alcohol typified by a dihydroxy compound represented by the following formula (2), and a compound having a cyclic ether structure represented by the following formula (3) are preferred. Incidentally, the compound having a cyclic ether structure is rigid and can enhance the mechanical property of the polycarbonate resin obtained but, on the other hand, is susceptible to coloration at a high temperature. However, according to the present invention, an effect of suppressing coloration is obtained. In particular, when a compound having two cyclic ether structures is used, the effect above is higher. Depending on the performance required of the polycarbonate resin, one of these dihydroxy compounds may be used alone, or two or more thereof may be used in combination.

[Chem. 5]

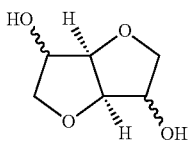

(2)

[Chem. 6]

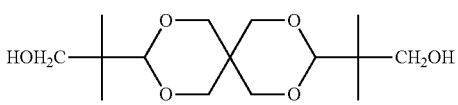

(3)

The dihydroxy compound represented by formula (2) includes isosorbide, isomannide, and isosorbide, which are in a stereoisomeric relationship. One of these compounds may be used alone, or two or more thereof may be used in combination.

Among these dihydroxy compounds, in view of hue of the polycarbonate resin, use of a dihydroxy compound having no aromatic ring structure is preferred, and above all, isosorbide obtained by dehydration condensation of sorbitol produced from various starches existing abundantly as a plant-derived resource and being easily available is most preferred from the aspects of ease of availability and production, light resistance, optical characteristics, moldability, heat resistance and carbon neutrality.

In the method for producing a polycarbonate resin of the present invention, a structural unit derived from a dihydroxy compound (hereinafter, sometimes referred to as "other dihydroxy compounds") except for the dihydroxy compound of the present invention may be contained as a raw material monomer. Examples of other dihydroxy compounds include an aliphatic dihydroxy compound such as ethylene glycol, 1,3-propanediol, 1,2-propanediol, 1,4-butanediol, 1,3-butanediol, 1,2-butanediol, 1,5-heptanediol and 1,6-hexanediol; an alicyclic dihydroxy compound such as 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol and 1,3-adamantanedimethanol; and aromatic bisphenols such as 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxydiphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dichlorodiphenyl ether, 9,9-bis(4-(2-hydroxyethoxy-2-methyl)phenyl)fluorene, 9,9-bis(4-hydroxyphenyl)fluorene and 9,9-bis(4-hydroxy-2-methylphenyl)fluorene.

Among these other dihydroxy compounds, in view of hue of the polycarbonate resin, a dihydroxy compound having no aromatic ring structure in the molecular structure, that is, at least one compound selected from the group consisting of an aliphatic dihydroxy compound and an alicyclic dihydroxy compound, is preferably used. The aliphatic dihydroxy compound is preferably 1,3-propanediol, 1,4-butanediol or 1,6-hexane diol, and the alicyclic dihydroxy compound is preferably 1,4-cyclohexanedimethanol or tricyclodecanedimethanol, and in view of polymerization reactivity and improvement of toughness, 1,4-cyclohexanedimethanol is more preferred.

Use of these other dihydroxy compounds can produce an effect such as improvement of flexibility, increase of heat resistance and enhancement of moldability of the polycarbonate resin, but if a structural unit derived from other dihydroxy compounds is contained at an excessively large proportion, this may lead to reduction in the mechanical properties or heat resistance. Therefore, the proportion of the structural unit derived from the dihydroxy compound may be 20 mol % or more, preferably 30 mol % or more, more preferably 50 mol % or more, based on structural units derived from all dihydroxy compounds. That is, the proportion of the structural unit derived from other dihydroxy compounds may be 80 mol % or less, preferably 70 mol % or less, more preferably 50 mol % or less, based on structural units derived from all dihydroxy compounds. If the amount used of the monomer having a structural unit derived from the dihydroxy compound of the present invention is too large, the melt viscosity of the obtained polycarbonate resin becomes high, and filtration using a filter with a small opening size may be difficult to apply, leading to increase of an extraneous matter, or pelletization or film formation may not be easily achieved. The proportion may be 90 mol % or less, preferably 85 mol % or less, more preferably 80 mol % or less.

The dihydroxy compound of the present invention may contain a stabilizer such as reducing agent, antioxidant, deoxidizer, light stabilizer, antacid, pH stabilizer and heat stabilizer. In particular, the dihydroxy compound of the present invention is susceptible to a change in quality under acidic conditions and therefore, in the case of storing the compound before use, it is preferred to contain a basic stabilizer. Examples of the basic stabilizer include hydroxides, carbonates, phosphates, phosphites, hypophosphites, borates and fatty acid salts of metals belonging to Group 1 or Group 2 of the long-form periodic table (Nomenclature of Inorganic Chemistry IUPAC Recommendations 2005); a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide; and an amine-based compound such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline. Among these, in view of the effects and ease of the later-described removal by distillation, a phosphate and a phosphite of Na or K are preferred, and 2Na hydrogenphosphate and 2Na hydrogenphosphite are more preferred.

The content of such a stabilizer in the dihydroxy compound of the present invention is not particularly limited, but if the content is too small, the effect of preventing a change in quality of the dihydroxy compound of the present invention may not be obtained, whereas if the content is too large, alteration of the dihydroxy compound of the present invention may be caused. Therefore, the content is usually from 0.0001 to 1 wt %, preferably from 0.001 to 0.1 wt %, based on the dihydroxy compound of the present invention.

In the case where the dihydroxy compound of the present invention is a compound having a cyclic ether structure, such as isosorbide, the compound is liable to be gradually oxidized by oxygen and therefore, it is important to prevent oxygen-induced decomposition by keeping away from inclusion of water during storage or production and at the same time, use a deoxidizer or the like or treat the compound in a nitrogen atmosphere. In particular, oxidation of isosorbide is sometimes associated with generation of a decomposition product such as formic acid. When isosorbide containing such a decomposition product is used as a raw material for the production of a polycarbonate resin, coloration of the obtained polycarbonate resin may be caused or not only the physical properties may be significantly deteriorated but also due to effect on the polymerization reaction, a polymer having a high molecular weight may not be obtained.

In order to obtain the dihydroxy compound of the present invention free from the oxidative decomposition product above or remove the basic stabilizer, purification by distillation may be performed before using the compound as a raw material after storage. The distillation in this case may be batch distillation or continuous distillation and is not particularly limited. As for the distillation conditions, distillation is preferably performed under reduced pressure in an inert gas atmosphere such as argon or nitrogen, and for completely removing oxygen, it is also possible to flow an inert gas into the liquid distillate before or during distillation. From the standpoint of inhibiting thermal alteration, the distillation may be preferably performed under the conditions of 250° C. or less, preferably 200° C. or less, more preferably 180° C. or less.

Through such purification by distillation, the formic acid content in the dihydroxy compound of the present invention is reduced to 20 ppm by weight or less, preferably 10 ppm by weight or less, more preferably 5 ppm by weight or less, and this is effective in producing a polycarbonate resin excellent in the hue and thermal stability without impairing the polymerization reactivity when dihydroxy compounds containing the dihydroxy compound of the present invention are used as a raw material for the production of a polycarbonate resin. Incidentally, the value of the formic acid content above is a value measured by ion chromatography.

(Carbonic Acid Diester)

In the present invention, dihydroxy compounds containing the dihydroxy compound of the present invention and a carbonic acid diester are used as raw materials and subjected to polycondensation through a transesterification reaction, whereby a polycarbonate resin can be obtained. The carbonic acid diester for use in the present invention includes those represented by the following structural formula (4). One of these carbonic acid diesters may be used alone, or two or more thereof may be mixed and used.

[Chem. 7]

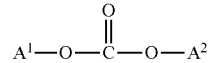

(4)

(wherein each of $A^1$ and $A^2$ is a substituted or unsubstituted aliphatic aromatic group having a carbon number of 1 to 18 or a substituted or unsubstituted aromatic group, and $A^1$ and $A^2$ may be the same or different).

Each of $A^1$ and $A^2$ is preferably a substituted or unsubstituted aromatic hydrocarbon group, more preferably an unsubstituted aromatic hydrocarbon group. Incidentally, the substituent on the aliphatic hydrocarbon group includes an ester group, an ether group, a carboxylic acid, an amide group, and a halogen, and the substituent on the aromatic hydrocarbon group includes an alkyl group such as methyl group and ethyl group.

Examples of the carbonic acid diester represented by formula (4) include diphenyl carbonate (hereinafter, sometimes referred to as "DPC"), a substituted diphenyl carbonate such as ditolyl carbonate, dimethyl carbonate, diethyl carbonate, and di-tert-butyl carbonate. Among these, diphenyl carbonate and a substituted diphenyl carbonate are preferred, and diphenyl carbonate is more preferred. Incidentally, the carbonic acid diester sometimes contains an impurity such as chloride ion, and the impurity may inhibit the polycondensation reaction or impair the hue of the obtained polycarbonate resin. Therefore, it is preferred to use a compound that has been purified by distillation or the like as needed.

In the method of the present invention, a polycarbonate resin is obtained by polycondensation through a transesterification reaction between dihydroxy compounds containing the dihydroxy compound of the present invention and a carbonic acid diester. The dihydroxy compound and carbonic acid diester as raw materials may be independently charged to a reaction tank to undergo a transesterification reaction but may be also uniformly mixed before a transesterification reaction. The temperature at the mixing may be 80° C. or more, preferably 90° C. or more, and on the other hand, the upper limit thereof may be 250° C. or less, preferably 200° C. or less, more preferably 150° C. or less. Above all, a temperature of 100 to 130° C. is suitable. If the mixing temperature is too low, the dissolution rate may be low, or the solubility may be insufficient, often leading to a trouble such as solidification, whereas if the mixing temperature is too high, thermal deterioration of the dihydroxy compound may be brought about, as a result, the hue of the obtained polycarbonate resin may be impaired to adversely affect the light resistance or heat resistance.

In the method of the present invention, the oxygen concentration in the environment for operation of mixing dihydroxy compounds containing the dihydroxy compound of the present invention and a carbonic acid diester as raw materials may be 10 vol % or less, preferably from 0.0001 to 10 vol %, more preferably from 0.0001 to 5 vol %, still more preferably from 0.0001 to 1 vol %, and mixing in this atmosphere is preferred from the standpoint of preventing worsening of the hue.

In the present invention, the carbonic acid diester may be used in a molar ratio of 0.90 to 1.20, preferably from 0.95 to 1.10, more preferably from 0.97 to 1.03, still more preferably from 0.99 to 1.02, based on all dihydroxy compounds containing the dihydroxy compound of the present invention used for the reaction. If this molar ratio becomes small, the terminal hydroxyl group of the produced polycarbonate resin may be increased and the thermal stability of the polymer may be impaired to cause coloration during molding, or the transesterification reaction rate may be reduced, failing in obtaining a desired high molecular weight product. On the other hand, if this molar ratio becomes large, the transesterification reaction rate may be reduced, production of a polycarbonate having a desired molecular weight may be difficult, or the amount of the carbonic acid diester remaining in the polycarbonate resin may be increased, leading to gas evolution during extrusion or molding. Reduction in the transesterification reaction rate may cause an increase in the heat history during polymerization reaction and lead to worsening of the hue of the obtained polycarbonate resin.

Furthermore, if the molar ratio of the carbonic acid diester to all dihydroxy compounds containing the dihydroxy compound of the present invention is increased, the amount of the carbonic acid diester remaining in the obtained polycarbonate resin may be increased, and this residual carbonic acid diester may disadvantageously become a gas during molding, causing a molding failure, or bleed out from the product. The concentration of the carbonic acid diester remaining in the polycarbonate resin obtained by the method of the present invention is preferably 200 ppm by weight or less, more preferably 100 ppm by weight or less, still more preferably 60 ppm by weight or less, yet still more preferably 30 ppm by weight or less.

(Catalyst)

In the method of the present invention, as described above, a transesterification reaction (hereinafter, sometimes simply referred to as "catalyst" or "polymerization catalyst") is caused to be present at the time of producing a polycarbonate resin by polycondensation through a transesterification reaction between dihydroxy compounds containing the dihydroxy compound of the present invention and a carbonic acid diester.

In the method of the present invention, the transesterification catalyst (catalyst) may affect particularly the thermal stability of the polycarbonate resin or the yellow index (YI) value indicative of the hue. The transesterification catalyst used is not particularly limited as long as the thermal stability and hue of the polycarbonate resin produced are satisfied, but the catalyst includes a compound of a metal belonging to Group 1 or 2 of the long-form periodic table (hereinafter, simply referred to as "Group 1" or "Group 2"), and a basic compound such as basic boron compound, basic phosphorus compound, basic ammonium compound and amine-based compound. At least either one of a Group 1 metal compound and a Group 2 metal compound is preferably used, and a compound of at least one metal selected from the group consisting of metals belonging to Group 2 of the long-form periodic table and lithium is more preferably used.

As for the form of the Group 1 metal compound and Group 2 metal compound, the compound is usually used in the form of a hydroxide or a salt such as carbonate, carboxylate and phenoxide, but a hydroxide, a carbonate and an acetate are preferred in view of ease of availability and handling, and an acetate is preferred in view of hue and polymerization activity.

Specific examples of the Group 1 metal compound include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium boron hydride, potassium boron hydride, lithium boron hydride, cesium boron hydride, sodium boron phenylate, potassium boron phenylate, lithium boron phenylate, cesium boron phenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, alcoholates and phenolates of sodium, potassium, lithium and cesium, and disodium, dipotassium, dilithium and dicesium salts of bisphenol A. Among these, a lithium compound is preferred.

Specific examples of the Group 2 metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among these, a magnesium compound, a calcium compound and a barium compound are preferred, at least one metal compound selected from the group consisting of a magnesium compound and a calcium compound is more preferred in view of polycondensation activity and hue of the obtained polycarbonate resin, and a calcium compound is most preferred.

Incidentally, together with at least either one of the Group 1 metal compound and the Group 2 metal compound, a basic compound such as basic boron compound, basic phosphorus compound, basic ammonium compound and amine-based compound may be secondarily used in combination, but it is particularly preferred to use only at least either one of the Group 1 metal compound and the Group 2 metal compound, because the basic compound may volatilize during the polymerization reaction and cause a trouble.

Examples of the basic boron compound that can be used in combination include sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

Examples of the basic phosphorus compound that can be used in combination include triethylphosphine, tri-n-propylphosphine, triisopropylphosphine, tri-n-butylphosphine, triphenylphosphine, tributylphosphine, and a quaternary phosphonium salt.

Examples of the basic ammonium compound that can be used in combination include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine-based compound that can be used in combination include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

The amount of the catalyst used may be from 0.1 to 300 µmol, preferably from 0.5 to 100 µmol, more preferably from 0.5 to 50 µmol, still more preferably from 0.5 to 20 µmol, yet still more preferably from 1 to 5 µmol, per mol of all dihydroxy compounds used. Above all, in the case of using a compound of at least one metal selected from metals belonging to Group 2 of the long-form periodic table and lithium, the amount of the catalyst used is usually 0.1 µmol or more, preferably 0.5 µmol or more, more preferably 0.7 µmol or more, per mol of all dihydroxy compounds used. The upper limit thereof is usually 20 µmol, preferably 10 µmol, more preferably 3 µmol, still more preferably 1.5 µmol, yet still more preferably 1.0 µmol.

If the amount of the catalyst used is too small, the polycondensation reaction can hardly proceed and a polycarbonate resin having a desired molecular weight may not be obtained. On the other hand, if the amount of the catalyst used is too large, the hue, thermal stability and the like of the obtained polycarbonate resin may be impaired due to an undesirable side reaction, or the catalyst may work out to an extraneous matter. Also, when a Group 1 metal, among others, sodium, potassium or cesium, particularly, sodium, is contained in a large amount in the polycarbonate resin, the metal may adversely affect the hue and since such a metal may migrate not only from the catalyst used but also from the raw material or reaction apparatus, the total amount of these compounds in the polycarbonate resin is, as the metal amount, usually 1 ppm by weight or less, preferably 0.8 ppm by weight or less, more preferably 0.7 ppm by weight or less. Incidentally, the metal amount in the polycarbonate resin can be measured by atomic emission, atomic absorption, Inductively Coupled Plasma (ICP) or other methods after recovering the metal in the polycarbonate resin by a wet ashing method or the like.

The catalyst may be added directly to a reactor; a method of adding the catalyst to a raw material preparation tank in which a dihydroxy compound and a carbonic acid diester are previously mixed, and then causing the catalyst to be present in a reactor may be employed; or the catalyst may be added in a line for feeding the raw material to a reactor. If the amount of the catalyst used is too small, a sufficient polymerization activity is not obtained, and the progress of the polymerization reaction is slowed down, as a result, a polycarbonate resin having a desired molecular weight can be hardly obtained, or long-term exposure to a heat history may be involved, leading to worsening of the hue.

<Production Method>
(Polycondensation Method)

In the method of the present invention, the method for performing polycondensation of the dihydroxy compound and the carbonic acid diester to obtain a polycarbonate resin may be performed in the presence of the above-described catalyst in multiple stages by using a plurality of reactors. The mode of reaction may be any of a batch method, a continuous method, and a combination of a batch method and a continuous method, but from the standpoint of stabilizing the quality, a continuous method is preferred. It is preferred that in the initial stage of polymerization, the polymerization is performed at a relatively low temperature under relatively low vacuum to obtain a prepolymer and in the later stage of polymerization, the polymerization is performed at a relatively high temperature under relatively high vacuum to raise the molecular weight to a predetermined value. However, in view of hue and thermal stability, important is to appropriately select the jacket temperature, the internal temperature and the pressure in the system for each molecular weight stage. For example, when either one of the temperature and the pressure is too early changed before the polymerization reaction reaches a predetermined value, an unreacted monomer is distilled off to disrupt the molar ratio between the dihydroxy compound and the carbonic acid diester, and reduction in the polymerization rate may be caused or a polymer having a predetermined molecular weight or a predetermined terminal group may not be obtained, as a result, the object of the present invention cannot be achieved.

Furthermore, use of a reflux condenser in a polymerization reactor is effective for reducing the amount of a monomer distilled off, and the effect thereof is high particularly in a reactor at the initial polymerization stage where the amount of an unreacted monomer ingredient is large. The temperature of a refrigerant introduced into the reflux condenser may be appropriately selected according to the monomer used, but the temperature of the refrigerant introduced into the reflux condenser is, at the inlet of the reflux condenser, usually from 45 to 180° C., preferably from 80 to 150° C., more preferably from 100 to 130° C. If the temperature of the refrigerant is too high, the reflux amount decreases and the effect is reduced, whereas if the temperature is too low, the distillation efficiency for the monohydroxy compound that should be originally removed by distillation tends to decrease. As the refrigerant, warm water, steam, heating medium oil or the like is used, and steam or heating medium oil is preferred.

In order to prevent generation of an extraneous matter in the final polycarbonate resin while appropriately maintaining the polymerization rate and suppressing the distillation of a monomer and cause no damage of the hue or thermal stability, selection of the kind and amount of the above-described catalyst is important. The reason why the polymerization is performed in the present invention by using a plurality of reactors is because the preferred polymerization reaction conditions differ between the initial stage and the later stage, that is, in the initial stage of polymerization reaction, the amount of a monomer contained in the reaction solution is large and therefore, important is to suppress volatilization of the monomer while maintaining a necessary polymerization rate, whereas in the later stage of polymerization reaction, important is to sufficiently remove a byproduct monohydroxy compound by distillation so as to shift the equilibrium to the polymerization side. For setting different polymerization reaction conditions in this way, use of a plurality of polymerization reactors arranged in series is preferred in view of production efficiency.

As described above, the number of reactors used for polymerization in the present invention may be sufficient if it is at least 2 or more, but in view of production efficiency and the like, the number of reactors is 3 or more, preferably from 3 to 5, more preferably 4. In the present invention, when two or more reactors are used, different reaction conditions may be set in respective reactors, or the temperature/pressure may be continuously changed among respective reactors, and, above all, a configuration where from one reactor to another reactor, the temperature is stepwise raised and the pressure is stepwise reduced, is preferred.

In the present invention, the polymerization catalyst may be added to a raw material preparation tank or a raw material storage tank or may be added directly to a polymerization tank, but in view of feed stability and polymerization control, a catalyst feed line may be provided in the middle of a raw material line before feeding to a polymerization tank, and the catalyst is preferably fed in the form of an aqueous solution.

If the polymerization reaction temperature is too low, this may lead to a decrease in the productivity or an increase of the heat history added to the product, whereas if the temperature is too high, not only volatilization of a monomer may be caused but also decomposition or coloration of the polycarbonate resin may be promoted.

Specifically, the temperature above is as follows. The reaction in the first stage may be performed at a temperature of, in terms of maximum internal temperature of the polymerization reactor, from 140 to 270° C., preferably from 170 to 240° C., more preferably from 180 to 210° C., under a pressure of 110 to 1 kPa, preferably from 70 to 5 kPa, more preferably from 30 to 10 kPa (absolute pressure), for 0.1 to 10 hours, preferably from 0.5 to 3 hours, while removing the byproduct monohydroxy compound by distillation out of the reaction system. The reaction in the first stage as used in the present invention indicates a reaction in a rector located most upstream of the process out of reactors achieving distillation of 5 wt % or more of the monohydroxy compound that is distilled off throughout the polymerization reaction.

The reaction in the second and subsequent stages is performed by gradually lowering the pressure of the reaction system from the pressure in the first stage and finally setting the pressure (absolute pressure) of the reaction system to 2 kPa or less, preferably 1 kPa or less, at 210° C. or more, preferably 220° C. or more, and at 270° C. or less, preferably at 250° C. or less, more preferably 240° C. or less, for 0.1 to 10 hours, preferably from 1 to 6 hours, more preferably from 0.5 to 3 hours, while removing the continuously occurring monohydroxy compound out of the reaction system.

Above all, in order to obtain a polycarbonate resin excellent in the hue and thermal stability by suppressing coloration or thermal deterioration of the polycarbonate resin, the maximum internal temperature in all reaction stages is preferably less than 260° C., more preferably less than 250° C., still more preferably less than 245° C. The internal temperature as used herein indicates the temperature of the process liquid and is usually measured by a thermometer using a thermocouple or the like attached to the reactor. Also, for inhibiting a drop of the polymerization rate in the latter half of the polymerization reaction and minimizing deterioration due to heat history, a horizontal reactor excellent in the plug-flow properties and interface renewal properties is preferably used in the final polymerization stage. If a high polymerization temperature and a too long polymerization time are employed so as to obtain a polycarbonate resin having a predetermined molecular weight, it should be kept in mind that the yellow index (YI) value indicative of the hue tends to increase.

In view of effective use of resources, the byproduct monohydroxy compound distilled off during reaction is preferably used as a raw material of fuels or chemicals. In particular, after performing purification as needed, the monohydroxy compound is preferably used as a raw material of diphenyl carbonate, bisphenol A or the like.

<Steps after Polycondensation Reaction>

After the above-described polycondensation reaction, the polycarbonate resin of the present invention is preferably filtered using a filter. Among others, in order to, for example, remove low-molecular-weight ingredients contained in the polycarbonate resin or implement the addition or kneading of a heat stabilizer and the like, it is preferred that the polycarbonate resin obtained by polycondensation is introduced into an extrude and subsequently, the polycarbonate resin discharged from the extruder is filtered using a filter.

The method for feeding the polycarbonate resin obtained by polycondensation as above to an extruder, performing filtration using a filter, and forming pellets includes, for example, the following methods:

a method where the polycarbonate resin is withdrawn in the molten state from the final polymerization reactor by using a gear pump, a screw or the like so as to generate a pressure necessary for filtration and filtered through a filter;

a method where the polycarbonate resin is fed in the molten state to a single-screw or twin-screw extruder from the final polymerization reactor, melt extruded, further subjected to, if desired, an operation such as filtration through a filter, then cooled/solidified in the form of a strand, and pelletized by a rotary cutter or the like;

a method where the polycarbonate resin is, without being solidified, fed in the molten state to a single-screw or twin-screw extruder from the final polymerization reactor, melt extruded, once cooled/solidified in the form of a strand and pelletized and thereafter, the pellet is again introduced into an extruder, further subjected to, if desired, an operation such as filtration through a filter, then cooled/solidified in the form of a strand and pelletized; and a method where the polycarbonate resin is withdrawn in the molten state from the final polymerization reactor, once cooled/solidified in the form of a strand and pelletized and thereafter, the pellet is again introduced into an extruder, then cooled/solidified in the form of a strand and pelletized.

Among these methods, in order to minimize the heat history and prevent thermal deterioration such as worsening of the hue or reduction in the molecular weight, a method where the polycarbonate resin obtained by polycondensation through a transesterification reaction is, without being solidified, fed still in the molten state to a single-screw or twin-screw extruder from the final polymerization reactor, melt extruded, then directly filtered through a filter, cooled/solidified in the form of a strand upon ejection from a die and pelletized by a rotary cutter or the like, is preferred.

(One Example of Production Apparatus)

One example of the apparatus used for performing the present invention of obtaining a polycarbonate resin from raw material monomers described above is shown in the process chart of FIG. 1. Here, isosorbide (ISB) is used as the dihydroxy compound of the present invention, which is a raw material monomer, 1,4-cyclohexanedimethanol (CHDM) is used as the other dihydroxy compound, diphenyl carbonate (DPC) is used as the carbonic acid diester, and calcium acetate is used as the polymerization catalyst.

First, in the raw material preparation process, molten DPC prepared at a predetermined temperature in a nitrogen gas atmosphere is continuously fed to a raw material mixing tank 2a through a raw material feed port 1a. Also, molten ISB and molten CHDM which are weighed in a nitrogen gas atmosphere are continuously fed to the raw material mixing tank 2a through raw material feed ports 1b and 1c, respectively. These materials are mixed by a stirring blade 3a in the raw material mixing tank 2a to obtain a uniform molten mixture of raw materials.

Next, the obtained molten mixture of raw materials is continuously fed to a first vertical stirring reactor 6a via a raw material feed pump 4a and a raw material barrier filter 5a.

Also, an aqueous calcium acetate solution as the raw material catalyst is continuously fed through a catalyst feed port 1d provided in the middle of a transfer line for the molten mixture of raw materials.

In the polycondensation process of the production apparatus of FIG. 1, a first vertical stirring reactor 6a, a second vertical stirring reactor 6b, a third vertical stirring reactor 6c, and a fourth horizontal stirring reactor 6d are provided in series. In each reactor, a polycondensation reaction is continuously performed by keeping the liquid level constant, and the polycondensation reaction solution discharged from the bottom of the first vertical stirring reactor 6a is continuously fed in sequence to the second vertical stirring reactor 6b, then to the third vertical stirring reactor 6c and further to the fourth horizontal stirring reactor 6d, thereby allowing a polycondensation reaction to proceed. The reaction conditions in respective reactors are preferably set to shift to a higher temperature, a higher vacuum and a lower stirring speed with the progress of the polycondensation reaction.

The first vertical stirring reactor 6a, the second vertical stirring reactor 6b and the third vertical stirring reactor 6c are provided with MAXBLEND blades 7a, 7b and 7c, respectively. The fourth horizontal stirring reactor 6d is provided with a two-shaft spectacle-shaped stirring blade 7d. After the third vertical stirring reactor 6c, the viscosity of the reaction solution transferred becomes high and therefore, a gear pump 4b is provided.

In the first vertical stirring reactor 6a and the second vertical stirring reactor 6b, the amount of heat supplied is sometimes increased in particular and therefore, internal heat exchangers 8a and 8b are provided, respectively, so as to prevent the temperature of the heating medium from rising excessively.

Incidentally, in these four reactors, distillation tubes 11a, 11b, 11c and 11d for discharging a byproduct and the like produced by the polycondensation reaction are attached, respectively. In the first vertical stirring reactor 6a and the second vertical stirring reactor 6b, reflux condensers 9a and 9b and reflux tubes 10a and 10b are provided, respectively, so as to return a part of the liquid distillate to the reaction system. The reflux ratio can be controlled by appropriately adjusting each of the pressure of the reactor and the temperature of the heating medium of the reflux condenser.

The distillation tubes 11a, 11b, 11c and 11d are connected to condensers 12a, 12b, 12c and 12d, respectively, and each reactor is kept in a predetermined decompressed state by a decompressor 13a, 13b, 13c or 13d.

A byproduct such as phenol (monohydroxy compound) is continuously liquefied and recovered from the condensers 12a, 12b, 12c, and 12d attached to respective reactors. Also, a cold trap (not shown) is provided on the downstream side of the condensers 12c and 12d attached to the third vertical stirring reactor 6c and the fourth horizontal stirring reactor 6d, respectively, whereby a byproduct is continuously solidified and recovered.

The reaction solution that has reached a predetermined molecular weight is withdrawn from the fourth horizontal stirring reactor 6d, transferred by a gear pump 4c to an extruder 15a. The line connecting the gear pump 4c and the extruder 15a is preferably a jacket-type double tube in which a heating medium flows on the outer side, and the temperature of the heating medium may be appropriately determined by taking into consideration the viscosity of the polycarbonate resin, the pressure loss of the line, and the thermal stability of the polycarbonate resin. However, if the temperature is too high, deterioration of the polycarbonate resin or gas evolution may be caused, and therefore, the heating medium temperature is usually 300° C. or less, preferably 280° C. or less, more preferably 260° C. or less, still more preferably 250° C. or less, and most preferably 240° C. or less. On the other hand, if the temperature is too low, the pressure loss in the line may be increased and the pipe diameter must be made large, but simultaneously, the residence time of the polycarbonate resin in the line may be prolonged to cause thermal deterioration. Therefore, the heating medium temperature is usually 150° C. or more, preferably 180° C. or more, more preferably 200° C. or more, still more preferably 210° C. or more, and most preferably 220° C. or more.

The extruder 15a is provided with a vacuum vent, whereby low molecular ingredients remaining in the polycarbonate are removed. Also, an antioxidant, a light stabilizer, a coloring agent, a release agent and the like are added, if desired.

The resin is fed to a filter 15b by a gear pump 4d from the extruder 15a, and an extraneous matter is filtered there. The resin passed through the filter 15b is drawn into a strand from a die 15c and thereafter, the resin is cooled/solidified with water in a strand cooling tank 16a and then pelletized by a strand cutter 16b. The thus-obtained polycarbonate resin pellet is pneumatically transported by a pneumatic blower 16c and sent to a product hopper 16d. A predetermined amount of a product weighed by a weigh scale 16e is packaged in a product bag 16f.

The gear pumps 4c and 4d are not limited in the kind, but a self-circulation sealed gear pump having a circuit for introducing a partial polymer into a gland part through a valve from the ejection side of the gear pump and returning the polymer to a suction port by applying a given pressure to the shaft seal part, and not using a gland packing in the sealed part is preferred from the standpoint of reducing the extraneous matter.

<Details of Pellet Production Process after Polymerization Reaction>

(Extruder)

In the present invention, the configuration of the extruder is not limited, but an extruder having a plurality of series heaters to adjust the temperature of a barrel (sometimes referred to as cylinder) and having a single-shaft or twin-shaft screw inside the barrel is preferred.

Among others, for enhancing the later-described devolatilization performance or achieving uniform kneading of an additive, a twin-shaft extruder is preferred. In this case, the rotation directions of the shafts may the same direction or different directions, but in view of kneading performance, the same direction is preferred. In this extruder, a heat stabilizer, a neutralizer, an ultraviolet absorber, a release agent, a coloring agent, an antistatic agent, a slip agent, a lubricant, a plasticizer, a compatibilizer, a flame retardant and the like, which are commonly known, may be added and kneaded.

Examples of the heat stabilizer include a phosphorous-based heat stabilizer such as triphenyl phosphite, tris(nonylphenyl)phosphite, tris(2,4-di-tert-butylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl) pentaerythrityl diphosphite, 2,2-methylenebis(4,6-di-tert-butylphenyl)octyl phosphite, bis(nonylphenyl)pentaerythrityl diphosphite, bis(2,4-di-tert-butylphenyl)pentaerythrityl diphosphite and distearyl pentaerythrityl diphosphite; a hindered phenol-based heat stabilizer such as triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythrityl tetrakis[3-(3,5-di-tert-butyl-4- hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamamide), diethyl 3,5-di-tert-butyl-4-hydroxybenzylphosphonate, tris(3,5-di-tert-butyl-4-hydroxybenzyl) isocyanurate, tetrakis(2,4-di-tert-butylphenyl) 4,4'-biphenylenediphosphinate and 3,9-bis(1,1-dimethyl-2-[β-(3-tert-butyl-4-hydroxy-5-methylphenyl)propionyloxy]ethyl-2, 4,8,10-tetraoxaspiro(5,5)undecane; and a sulfur-based heat stabilizer such as dilauryl-3,3'-thiodipropionic acid ester, ditridecyl-3,3'-thiodipropionic acid ester, dimyristyl-3,3'-thiodipropionic acid ester, distearyl-3,3'-thiodipropionicacid ester, lauryl stearyl-3,3'-thiodipropionic acid ester, pentaerythrityl tetrakis(3-mercaptopropionate), pentaerythrityl tetrakis(3-laurylthiopropionate), glycerol-3-stearylthiopropionate, bis[2-methyl-4-(3-laurylthiopropionyloxy)-5-tert-butylphenyl]sulfide, octadecyl disulfide, mercaptobenzimidazole, 2-mercapto-6-methylbenzimidazole and 1,1'-thiobis (2-naphthol). In addition, a hindered amine-based heat stabilizer may be used. These heat stabilizers are used individually or in combination.

Among phosphorus-based heat stabilizers, tris(nonylphenyl)phosphite, trimethyl phosphate, tris(2,4-di-tert-butylphenyl)phosphite, bis(2,4-di-tert-butylphenyl)pentaerythrityl diphosphite and bis(2,6-di-tert-butyl-4-methylphenyl)pentaerythrityl diphosphite are preferably used. One of these compounds may be used, or two or more thereof may be used in combination.

The content of the phosphite-based heat stabilizer is from 0.0001 to 1 part by weight, preferably from 0.001 to 0.1 parts by weight, still more preferably from 0.003 to 0.01 parts by weight, per 100 parts by weight of the polycarbonate resin (a).

If the content is too small, the effect of suppressing coloration may be insufficient, whereas if the content is too large, the deposit on the metal mold surface or in the case of film forming, on the cooling roll surface may be increased not only to impair the surface appearance of the product but also to reduce the hydrolysis resistance.

The hindered phenol-based heat stabilizer is preferably a compound having an aromatic monohydroxy skeleton substituted with one or more alkyl groups having a carbon number of 5 or more, and specific preferred examples thereof include octadecyl-3-(3,5-di-tert-butyl-4-hydroxyphenyl)propionate, pentaerythrityl-tetrakis[3-(3,5-di-tert-butyl-4-hydroxyphenyl)propionate], 1,6-hexanediol-bis[3-(3,5-di-tert-butyl-4-hydroxyphenyl)propionate], and 1,3,5-trimethyl-2,4,6-tris(3, 5-di-tert-butyl-4-hydroxybenzyl)benzene, with pentaerythrityl-tetrakis[3-(3,5-di-tert-butyl-4-hydroxyphenyl)propionate] being more preferred.

Here, the content of the phenol-based antioxidant (d) is preferably from 0.0001 to 1 part by weight, more preferably from 0.001 to 0.3 parts by weight, still more preferably from 0.005 to 0.1 parts by weight, per 100 parts by weight of the polycarbonate resin (a).

If the content is too small, the effect of suppressing coloration may be insufficient, whereas if the content is too large, the deposit on the metal mold surface or in the case of film forming, on the cooling roll surface may be increased to impair the surface appearance of the product. In the case of using a phosphite-based heat stabilizer and a hindered phenol-based heat stabilizer in combination, the effect is large.

Examples of the release agent include a higher fatty acid, a higher fatty acid ester of a monohydric or polyhydric alcohol, a natural animal wax such as beeswax, a natural plant wax such as carnauba wax, a natural petroleum wax such as paraffin wax, a natural coal wax such as montan wax, an olefin-based wax, a silicone oil, and an organopolysiloxane. Among these, a higher fatty acid and a higher fatty acid ester of a monohydric or polyhydric alcohol are preferred.

The higher fatty acid ester is preferably a partial or complete ester of a substituted or unsubstituted, monohydric or polyhydric alcohol having a carbon number of 1 to 20 with a substituted or unsubstituted, saturated fatty acid having a carbon number of 10 to 30. Examples of the partial or complete ester of a monohydric or polyhydric alcohol with a saturated fatty acid include stearic acid monoglyceride, stearic acid diglyceride, stearic acid triglyceride, stearic acid monosorbitate, stearyl stearate, behenic acid monoglyceride, behenyl behenate, pentaerythrityl monostearate, pentaerythrityl tetrastearate, pentaerythrityl tetrapelargonate, propylene glycol monostearate, stearyl stearate, palmityl palmitate, butyl stearate, methyl laurate, isopropyl palmitate, biphenyl biphenate, sorbitan monostearate, and 2-ethylhexyl stearate. Among these, stearic acid monoglyceride, stearic acid triglyceride, pentaerythrityl tetrastearate and behenyl behenate are preferably used.

The higher fatty acid is preferably a substituted or unsubstituted, saturated fatty acid having a carbon number of 10 to 30. Examples of such a saturated fatty acid include myristic acid, lauric acid, palmitic acid, stearic acid, and behenic acid. One of these release agents (e) may be used alone, or two or more thereof may be mixed and used. The content of the release agent (e) is from 0.0001 to 2 parts by weight, preferably 0.01 to 1 part by weight, more preferably from 0.1 to 0.5 parts by weight, per 100 parts by weight of the polycarbonate resin (a). If the content of the release agent is small, the effect tends to become small, whereas if the content is too large, the deposit on the metal mold surface or in the case of film forming, on the cooling roll surface may be increased to impair the surface appearance of the product.

In the polycarbonate resin obtained as above by polycondensation, a raw material monomer having the possibility of adversely affecting the hue or thermal stability as well as the product by causing bleed-out or the like, a byproduct monohydroxy compound generated by the transesterification reaction, or a low-molecular-weight compound such as polycarbonate oligomer remains in many cases, but it is also possible to devolatilize/remove such a compound by using an extruder having a vent opening and preferably reducing the pressure through the vent opening by means of a vacuum pump or the like. In addition, the devolatilization may be accelerated by introducing a volatile liquid such as water into the extruder. The amount of water introduced is usually from 0.01 to 0.5 parts by weight, preferably from 0.1 to 0.3 parts by weight, per 100 parts by weight of the polycarbonate resin treated. The number of vent openings may be one or plural but is preferably 2 or more.

Furthermore, in order to suppress the thermal deterioration of the polycarbonate resin in the extruder, the ration speed of the shaft (hereinafter, sometimes referred to as screw) provided in the extruder is set to 300 rpm or less, preferably 250 rpm or less, more preferably 200 rpm or less. If the rotation speed of the screw exceeds 300 rpm, the shear heat generation of the polycarbonate resin is increased to cause worsening of the hue or reduction in the molecular weight. On the other hand, if the rotation speed of the screw is too low, not only the devolatilization performance or the kneading performance for additives may change for the worse but also the throughput per unit time may decrease to cause reduction in the productivity. Therefore, the rotation speed is preferably 50 rpm or more, more preferably 70 rpm or more.

The circumferential speed of the screw is appropriately determined by the diameter and rotation speed of the screw in the extruder, but for suppressing thermal deterioration ascribable to heat generation by shearing of the polycarbonate resin, such as coloration or decrease in the molecular weight, the circumferential speed is usually 1.0 m/sec or less, preferably 0.6 m/sec or less, more preferably 0.4 m/sec or less. On the other hand, if the circumferential speed is too low, this tends to cause vent-up during vacuum devolatilization or reduce the devolatilization performance or the dispersion performance for additives. Therefore, the circumferential speed is usually 0.05 m/sec or more, preferably 0.1 m/sec or more.

Usually, the screw of an extruder consists of a plurality of elements (screw elements) so as to impart various functions and generally consists of, for example, a full flight composed of only a spiral thread (a flight) mainly for transporting a resin, a kneading disc for kneading the resin, and a seal ring for sealing the resin, and according to the purpose, a reverse flight in which the thread is arranged in the direction opposite the resin transporting direction is also used. Also, the thread includes a double thread and a triple thread by the thread cutting, but in the present invention, a double-threaded deep-groove type capable of providing for a large throughput relative to the screw diameter of the extruder and suppressing shear heat generation caused by the screw rotation is preferred.

In the present invention, the configuration of these screw elements is not limited but preferably includes a kneading disc, and the total length of the kneading disc is preferably 20% or less, more preferably 15% or less, and most preferably 10% or less, of the length of the screw as a whole. If the total length of the kneading disc is too long, local heat generation due to shearing of the resin may increase, and a problem of impairing the hue of the polycarbonate resin or decreasing the molecular weight is readily caused. On the other hand, if the total length of the kneading disc is too short, the performance at the devolatilization or kneading of additives may be reduced. Therefore, the total length of the kneading disc is preferably 3% or more, more preferably 5% or more, of the total length of the screw as a whole.

The kneading disc includes a forward type, an orthogonal type, and a reverse type by the transport direction for the resin and can be appropriately selected according to the viscosity of the resin used or the performance required.

As for the material of the screw element, it is preferred to keep the iron content low by increasing the content of nickel or the like on the surface or apply a treatment with TiN or CrN for increasing the surface hardness.

In the present invention, the temperature of the resin when the polycarbonate resin is fed still in the molten state to the extruder needs to be 180° C. or more and is preferably 200° C. or more, more preferably 215° C. or more, still more preferably 220° C. or more. The upper limit thereof needs to be less than 250° C. and is preferably less than 245° C., more preferably less than 240° C., still more preferably less than 235° C. If the temperature of the polycarbonate resin fed to the extruder is too low, not only the load of the extruder may be increased to make the extrusion operation unstable or the extruder may stop due to an overload but also the shear heat generation in the extruder may become large, resulting in deterioration of the polycarbonate resin, whereas if the temperature is too high, deterioration of the polycarbonate resin is likely to occur and this tends to cause worsening of the hue, decrease in the molecular weight and in turn, reduction in the mechanical strength.

The temperature of the polycarbonate resin fed to the extruder can be controlled, for example, by a method of controlling the internal temperature of the final polymerization reactor, controlling the temperature of the line for feeding the polycarbonate resin to the extruder, or providing a heat exchanger.

Also in the case where the polycarbonate resin obtained by polycondensation is once cooled and thereafter, is anew melted by heating and then fed to the extruder, the temperature of the polycarbonate resin at the feeding must satisfy the same temperature conditions as above.

Furthermore, the glass transition temperature of the polycarbonate resin fed to the extruder is preferably 80° C. or more, more preferably 85° C. or more, still more preferably 90° C. of more. If the glass transition temperature is too low, the heat resistance is poor and at the time of forming a molded article from the obtained polycarbonate resin, the field-of-use is limited.

On the other hand, if the glass transition temperature is high, the melt viscosity may be excessively increased, and a polycarbonate resin having practical mechanical properties may not be obtained in an industrial reactor substantially having an upper limit of the temperature, or when the polymerization temperature is raised, in the case of a polycarbonate resin with poor thermal stability, a decomposition reaction may emerges, failing in obtaining a polycarbonate resin having practical mechanical properties.

Even if a polycarbonate resin is obtained by the polymerization reaction, in the case of a polycarbonate resin having a high glass transition temperature, its melt viscosity becomes high in the region where the resin has a practical molecular weight, and deterioration of the polycarbonate resin may be caused by shear heat generation in the extruder. Therefore, in the present invention, the glass transition temperature of the polycarbonate resin is preferably less than 145° C., more preferably 140° C. or less, still more preferably 135° C. or less.

Incidentally, the glass transition temperature as used in the present invention indicates an extrapolated glass transition initiation temperature determined from DSC data obtained (obtained in the second temperature rise) by, under a nitrogen stream, raising the temperature at a temperature rise rate of 20° C./min from room temperature to a temperature sufficiently exceeding the glass transition temperature, holding the temperature for 3 minutes, cooling the resin to 30° C. at a rate of 20° C./min, holding the resin at 30° C. for 3 minutes, and again raising the temperature at a rate of 20° C./min to a temperature sufficiently exceeding the glass transition temperature.

In this connection, usually, the glass transition temperature of the polycarbonate obtained after discharge from the extruder and, if desired, passing through a filter is substantially kept from a change by the extruder and treatment with the filter and therefore, the glass transition temperature of the polycarbonate resin fed to the extruder is basically passed on. In the measurement of the glass transition method, use of the polycarbonate resin finally obtained through the extruder is simpler and more practical than use of the polycarbonate fed to the extruder. Accordingly, in the present invention, as described in Examples later, the glass transition temperature of the polycarbonate resin fed to the extruder can be replaced by the glass transition temperature of the polycarbonate resin obtained through the extruder. In this case, the preferred glass transition temperature of the polycarbonate resin obtained through the extruder is naturally the same as the preferred range of the glass transition temperature of the polycarbonate resin fed to the extruder.

As for the configuration of the extruder used in the present invention, an extruder having a plurality of series heaters to adjust the temperature of a barrel (sometimes referred to as cylinder) and having a single-shaft or twin-shaft screw inside the barrel is preferred.

The polycarbonate resin fed under the above-described conditions is extruded while heating or cooling a continuous barrel enveloping the screw by using the plurality of heaters. In the present invention, the preset temperature of at least one heater is preferably less than 250° C., more preferably 240° C. or less, still more preferably 220° C. or less, yet still more preferably 200° C. or less. By thus setting the heater, a resin heated to a temperature higher than the range above is cooled there, and the polycarbonate resin is prevented from deterioration due to heat. Even when a part of the heater is at a temperature exceeding the upper limit of the range above, the present invention can be practiced, but in order to more completely prevent overheating, all heaters are preferably at less than 250° C.

On the other hand, out of the heaters set to be less than 250° C. for the purpose of preventing over heating, the preset temperature of at least one heater is preferably 100° C. or more. If the extruder barrel has a portion at an excessively low temperature, the polycarbonate resin contacted with the portion of the barrel may be rapidly cooled by the portion to increase in the viscosity, and the shear heat generation may become large to rather promote deterioration of the polycarbonate resin or the load of the motor for rotating the screw may be raised. The preset temperature of the heater is preferably 120° C. or more, more preferably 140° C. or more, still more preferably 160° C. or more. Incidentally, for the same reason as above, all heaters are preferably at 100° C. or more.

In the extruder, due to shear heat generation, the resin temperature is likely to rise as progresses close particularly to the outlet. Accordingly, the low temperature portion is preferably present more on the outlet side. That is, each heater may be sufficient if its preset temperature is the same as or lower than the preset temperature of the adjacent heater on the polycarbonate resin feed side. In other words, the preset temperature of each heater is preferably not higher than that of the adjacent heater on the polycarbonate resin feed side. Specifically, the preset temperature of each heater is preferably lower than the preset temperature of the adjacent heater on the polycarbonate resin feed side of the extruder by 5° C. or more, more preferably by 10° C. or more. However, if the polycarbonate resin is too rapidly cooled, its viscosity may be increased to rather cause local overheating. Therefore, the temperature difference with respect to the adjacent heater on the feed side is preferably 50° C. or less.

Above all, it is preferred that the preset temperature of the heater closest to the inlet side is from 200° C. to less than 250° C. and the preset temperature of the heat closest to the outlet side is from 100 to 220° C.

In this connection, if the temperature of the polycarbonate resin fed is too much lowered by envisaging shear heat generation due to screw rotation or the preset temperature of the heater of the extruder is excessively lowered so as to allow the temperature of the polycarbonate resin fed to drop in the extruder, the load on the extruder may be increased to make the screw rotation unstable or cause overloading of the motor. Therefore, in the method of the present invention, the difference between the temperature of the polycarbonate resin introduced into the extruder and the temperature of the polycarbonate resin ejected from a die is preferably within 50° C., more preferably within 30° C., still more preferably within 20° C.

In the present invention, assuming that the weight of the resin extruded per hour from the extruder is W (kg/h) and the cross-sectional area of the barrel of the extruder is S (m$^2$), the following formula (5) is preferably satisfied:

$$12000 \leq W/S \leq 60000 \tag{5}$$

If W/S is too small, not only the size of the extruder for the amount of the polycarbonate resin treated may become excessively large but also the residence time in the extruder may be increased to cause decrease in the molecular weight or deterioration such as coloration of the polycarbonate resin. Therefore, the lower limit is preferably 15,000, more preferably 20,000, still more preferably 25,000. On the other hand, if the ratio is too large, an excessive polycarbonate resin for the size of the extruder may be fed to cause reduction in the devolatilization efficiency or deterioration of the polycarbonate resin due to shear heat generation. Therefore, the upper limit is preferably 50,000, more preferably 40,000, still more preferably 35,000.

Furthermore, in the present invention, the temperature of the polycarbonate resin discharged from the extruder is preferably less than 280° C., more preferably less than 270° C., still more preferably less than 260° C. If the polycarbonate resin discharged from the extruder is at 280° C. or more, deterioration of the polycarbonate resin is likely to occur and this tends to cause worsening of the hue, decrease in the molecular weight and in turn, reduction in the mechanical strength. On the contrary, if the temperature of the polycarbonate resin discharged from the extruder is too low, the melt viscosity of the polycarbonate resin may become high and the load on the extruder may be increased to make the screw rotation unstable or cause overloading of the motor. Therefore, this temperature is preferably 220° C. or more, more preferably 230° C. or more, still more preferably 240° C. or more. Usually, the extruder produces heat generation due to resin shearing associated with the screw rotation and in general, the temperature of the polycarbonate resin tends to be higher than the temperature of the polycarbonate resin fed. This tendency is marked particularly when the polycarbonate resin has a high molecular weight and a high melt viscosity. Although when the temperature of the polycarbonate resin is raised, the melt viscosity is likely to decrease and the shear heat generation may be reduced in proportion, if the polycarbonate resin temperature itself is high, deterioration is likely to occur and this tends to cause worsening of the hue, decrease in the molecular weight and in turn, reduction in the mechanical strength. Thus, it is not easy to perform the extrusion while preventing deterioration of a high-viscosity polycarbonate resin whose thermal stability is poor.

The temperature of the polycarbonate resin discharged from the extruder may be controlled by the temperature of the polycarbonate resin fed to the extruder or the temperature of the heater attached to the barrel, but since the temperature is sometimes varied by the amount of the polycarbonate resin fed to the extruder, the rotation speed of the screw of the extruder or the configuration of screw elements, these conditions are also preferably controlled in combination.

In particular, a polycarbonate resin with a high viscosity has a tendency that the shear heat generation due to screw rotation becomes large and the temperature of the resin discharged rises relative to the temperature of the resin fed, and therefore, in order to prevent the polycarbonate resin from deterioration by shear heat generation while maintaining the dispersion of an additive, the devolatilization performance, the productivity and the like, selection of the rotation speed or circumferential speed of the screw and the configuration of elements as well as the setting of the heater temperature are important.

(Filter)

In the present invention, the polycarbonate resin obtained by polycondensation is, after devolatilization or mixing with an additive in the extruder, preferably filtered through a filter so as to remove an extraneous matter contained in the resin, such as burn deposit and gel. Among others, in order to remove the residual monomer, by-product phenol and the like by devolatilization under reduced pressure and mix an additive such as heat stabilizer and release agent, the polycarbonate resin extruded by an extruder is preferably filtered through a filter.

As for the form of the filter, a known filter such as candle type, pleat type and leaf disc type can be used, but among others, a leaf disc type capable of providing for a large filtration area relative to the filter containment vessel is preferred and also, a plurality of discs are preferably combined and used so that a large filtration area can be provided. The leaf disc-type filter is composed by combining a filtration member (hereinafter, sometimes referred to as medium) with a holding member (sometimes referred to as retainer) and is used in the form of a unit (sometimes referred to as filter unit) where those filters (depending on the case, a plurality of sheets or a plurality of pieces) are housed in a containment vessel.

In the present invention, in order to reduce the differential pressure (pressure loss) of the filter, a filter of a type where a plurality of perforated media are overlapped and the opening size decreases in sequence from the direction in which the resin intrudes, is preferred. A filter of a type where a metal-made powder is sintered on the filter surface so as to pulverize a gel, may be also used.

In the present invention, the opening size of the filter is, in terms of 99% filtration accuracy, preferably 50 µm or less, more preferably 30 µm or less, still more preferably 20 µm or less, and in the case of reducing particularly an extraneous matter, the opening size is preferably 15 µm or less. However, if the opening size is small, the pressure loss in the filter may be increased to cause breakage of the filter or deterioration of the polycarbonate resin due to shear heat generation. Therefore, the opening size is, in terms of 99% filtration accuracy, preferably 1 µm or more. Incidentally, the opening size defined here as 99% filtration accuracy indicates the value of $\chi$ when the $\beta\chi$ value represented by the following formula (6) determined in accordance with ISO 16889 is 100.

$$\beta\chi = \text{(number of particles on the primary side larger than } \chi \text{ µm)/(number of particles on the secondary side larger than } \chi \text{ µm)} \quad (6)$$

(wherein the primary side indicates before filtration through a filter, and the secondary side indicates after filtration).

The material for the medium of the filter is not particularly limited as long as it has strength and heat resistance necessary for filtration of a resin, but a metal, particularly a stainless steel-based metal with a small iron content, such as SUS316 and SUS316L, is preferred. As for the kind of weaving, a filter where the extraneous matter trapping portion is in a regularly woven state, such as plain woven, twilled, plain dutch woven and twilled dutch woven, and in addition, a nonwoven fabric-type filter may be used. In the present invention, a nonwoven fabric type having a high ability of trapping a gel, among others, a type where steel wires constituting the nonwoven fabric are fixed to each other by sintering, is preferred.

If an iron ingredient is contained in the filter, the ingredient is likely to deteriorate the resin during filtration at a high temperature of more than 200° C., and therefore, as described above, in the case of a stainless steel, the content of iron ingredient is preferably small. Furthermore, the filter is preferably subjected to a passivation treatment before use.

Examples of the method for the passivation treatment include a method of dipping the filter in an acid such as nitric acid or flowing an acid through the filter, thereby forming a passivation film on the surface, a method of applying a roasting (heating) treatment in the presence of water vapor or oxygen, and a method using these methods in combination. Among others, it is preferred to perform both a nitric acid treatment and roasting.

In the case of applying a roasting treatment to the filter, the roasting temperature is usually from 350 to 500° C., preferably from 350 to 450° C., and the roasting time is usually from 3 to 200 hours, preferably from 5 to 100 hours. If the roasting temperature is too low or the roasting time is too short, insufficient formation of a passivation film may result, and the polycarbonate resin tends to deteriorate during filtration. On the other hand, if the roasting temperature is too high or the roasting time is too long, the filer medium may be seriously damaged, failing in producing the necessary filtration accuracy.

Also, at the time of treating the filter with a nitric acid, the nitric acid concentration is usually from 5 to 50 wt %, preferably from 10 to 30 wt %, the treatment temperature is usually from 5 to 100° C., preferably from 50 to 90° C., and the treatment time is usually from 5 to 120 minutes, preferably from 10 to 60 minutes. If the nitric acid concentration is too low, the treatment temperature is too low or the treatment time is too short, insufficient formation of a passivation film may result, whereas if the nitric acid concentration is too high, the treatment temperature is too high or the treatment time is too long, the filter media may be seriously damaged, failing in producing the necessary filtration accuracy.

The filter is preferably housed in a containment vessel, because when a pressure is applied, filtration readily proceeds. The material for the containment vessel is also not particularly limited as long as it has strength and heat resistance enough to withstand filtration of a resin, but a stainless steel-based metal with a small iron content, such as SUS316 and SUS316L, is preferred. If the iron content is large, the polycarbonate resin may be deteriorated, similarly to the above.

In the filter containment vessel, the feed port and the discharge port for the polycarbonate resin may be arranged substantially in a horizontal configuration, may be arranged substantially in a vertical configuration, or may be arranged in an oblique configuration, but in order to reduce the residence time of a gas and the polycarbonate resin in the containment vessel and prevent deterioration of the polycarbonate resin, it is preferred to arrange the feed port for the polycarbonate resin in the lower part of the filter containment vessel and the discharge port in the upper part and make the polycarbonate resin before filtration be fed from the lower part of the filter containment vessel and the polycarbonate resin after filtration be discharged from the upper part of the containment vessel.

The value obtained by dividing the internal volume ($m^3$) of the filter containment vessel by the flow rate ($m^3$/min) of the polycarbonate resin may be from 1 to 20 minutes, preferably from 2 to 10 minutes, more preferably from 2 to 5 minutes, because if the value is too small, the differential pressure of the filter may be increased to cause damage of the filter, whereas if the value is too large, deterioration of the polycarbonate resin may occur during filtration.

In the method of the present invention, the temperature of the polycarbonate resin before filtration through the filter is preferably less than 280° C., more preferably less than 270° C., still more preferably less than 265° C., yet still more preferably less than 260° C. If the temperature before filtration through the filter is 280° C. or more, thermal deterioration is likely to occur in the filter unit and this tends to cause worsening of the hue, decrease in the molecular weight and in turn, reduction in the mechanical strength. On the other hand, the temperature before filtration through the filter is preferably 220° C. or more, more preferably 230° C. or more, still more preferably 240° C. or more, because if the temperature is too low, the melt viscosity of the polycarbonate may become high and the load on the filter may be increased to cause breakage of the filter.

In the method of the present invention, the filter unit performs the temperature control usually by placing a heater composed of a plurality of blocks on the outside of the unit, and the heater is usually set to 280° C. or less, preferably 260° C. or less, more preferably 250° C. or less, because if the preset temperature thereof is too high, deterioration of the polycarbonate resin may be caused. On the other hand, if the preset temperature is too low, the melt viscosity becomes high and this makes it difficult to filter the resin through the filter. Therefore, the heater is usually set to 150° C. or more, preferably 180° C. or more, more preferably 200° C. or more.

In addition, a heater is usually placed also on the outside of a line for guiding the polycarbonate resin discharged from the filter unit to a die, and the heater is usually set to 280° C. or less, preferably 260° C. or less, more preferably 250° C. or less, because if the preset temperature thereof is too high, deterioration of the polycarbonate resin may be caused. On the other hand, if the preset temperature is too low, the melt viscosity becomes high to increase the pressure loss in the line. Therefore, the heater is usually set to 150° C. or more, preferably 180° C. or more, more preferably 200° C. or more. Furthermore, the residence time of the polycarbonate resin between the outlet of the filter unit and the die is usually set to be from 1 to 30 minutes, preferably from 3 to 20 minutes, because if the residence time is long, deterioration of the polycarbonate resin may be caused.

In the method of the present invention, the temperature of the polycarbonate resin ejected from the die after devolatilization and mixing in the extruder and preferably filtration through the filter may be 200° C. or more, preferably 220° C. or more, more preferably 230° C. of more, and the upper limit may be less than 280° C., preferably less than 270° C., more preferably less than 265° C., still more preferably less than 260° C. If the temperature of the polycarbonate resin ejected from the die is too low, the melt viscosity may become high, as a result, the strand formed by extrusion may be unstable, making it difficult to perform pelletization by a rotary cutter or the like. On the other hand, if the temperature is too high, thermal deterioration of the polycarbonate resin is likely to occur and this may cause gas evolution, worsening of the hue, decrease in the molecular weight and in turn, reduction in the mechanical strength.

A heater is usually placed on the die, and the heater is usually set to 280° C. or less, preferably 260° C. or less, more preferably 250° C. or less, because if the preset temperature thereof is too high, deterioration of the polycarbonate resin may be caused. On the other hand, if the preset temperature is too low, the melt viscosity becomes high to increase the pressure loss in the line. Therefore, the heater is usually set to 150° C. or more, preferably 180° C. or more, more preferably 200° C. or more.

Usually, when the polycarbonate resin is mixed in the extruder, shear heat generation due to screw rotation is added and in the case of using a filter, the temperature rises due to the shear heat generation during filtration through the filter with a small opening size. Therefore, in order to control the temperature of the polycarbonate resin ejected from the die, it is important to comprehensively control, for example, the throughput of the polycarbonate resin per hour in the extruder, the temperature setting of the barrel, the rotation speed or circumferential speed of the screw, the configuration of elements, the opening size, filtration area and temperature setting of the filter, the temperature setting of the die or the line in which the polymer flows, the molecular weight of the polycarbonate resin.

In the method of the present invention, assuming that the terminal double bond of the polycarbonate resin obtained by polycondensation through a transesterification reaction, before being introduced into the extruder, is X μeq/g and the terminal double bond of the polycarbonate resin constituting a polycarbonate resin pellet obtained by mixing in the extruder, depending on the situation, filtering through the filter, and by means of a cutter after ejection in a strand form from the die and cooling is Y μeq/g, the following formula (7) is preferably satisfied:

$$Y-X \leq 50 \tag{7}$$

Y−X is preferably Y−X≤30, more preferably Y−X≤15, still more preferably Y−X≤10, and most preferably Y−X≤5. If Y−X exceeds 30, not only a colored ingredient presumably derived from the double bond tends to be produced but also gas evolution in or around the filter may be promoted to bring about unstable ejection of a strand and make the pelletization by a cutter difficult.

In the method of the present invention, in the case of using the filter, assuming that the terminal double bond of the polycarbonate resin before being introduced into the filter is x μeq/g and the terminal double bond of the polycarbonate resin constituting a polycarbonate resin pellet obtained by means of a cutter after ejection in a strand form from the die and cooling is Y μeq/g, the following formula (8) is preferably satisfied:

$$Y-x \leq 10 \tag{8}$$

Y−x is preferably Y−x≤8, more preferably Y−x≤5. If Y−x exceeds 10, not only a colored ingredient presumably derived from the double bond tends to be produced but also gas evolution in or around the filter may be promoted to bring about unstable ejection of a strand and make the pelletization by a cutter difficult.

In the method of the present invention, x−X indicates an increase of the terminal double bond in the extruder, and the value thereof is preferably 30 μeq/g or less, more preferably 20 μeq/g or less, still more preferably 10 μeq/g or less, yet still more preferably 5 μeq/g or less. If x−X exceeds 30 μeq/g, not only a colored component tends to be produced in the extruder but also gas evolution in the filter or in the line around the filter may be promoted to bring about unstable ejection of a strand and make the pelletization by a cutter difficult.

In the present invention, assuming that the reduced viscosity ($\eta_{sp}/c$) of the polycarbonate resin fed to the extruder, which is obtained by polycondensation through a transesterification, is a and the reduced viscosity ($\eta_{sp}/c$) of the polycarbonate resin constituting a polycarbonate resin pellet obtained by mixing in the extruder, depending on the situation, filtering through the filter, and by means of a cutter after ejection in a strand form from the die and cooling is B, the following formula (9) is preferably satisfied:

$$0.8 < B/a < 1.1 \tag{9}$$

B/a is preferably B/a>0.85, more preferably B/a>0.9, still more preferably B/a>0.95. If B/a is 0.8 or less, a colored ingredient or an ingredient working out to a coloring precursor, which is presumably generated due to a side reaction, tends to be disadvantageously produced. On the other hand, if the reduced viscosity rises in the extruder, production of an extraneous matter such as gel and burn deposit emerges. Therefore, B/a≤1.0 is preferred. The method for measuring the reduced viscosity is described later.

Furthermore, in the method of the present invention, in the case of providing the filter on the downstream side of the extruder, assuming that the reduced viscosity ($\eta_{sp}/c$) of the polycarbonate resin fed to the filter is A and the reduced viscosity ($\eta_{sp}/c$) of the polycarbonate resin constituting a polycarbonate resin pellet obtained by means of filtration through the filter and a cutter after ejection in a strand form from the die and cooling is B, the following formula (10) is preferably satisfied:

$$0.8 < B/A < 1.1 \tag{10}$$

B/A is preferably B/A>0.85, more preferably B/A>0.9, still more preferably B/A>0.95. If B/A is 0.8 or less, a colored ingredient or an ingredient working out to a coloring precursor, which is presumably generated due to a side reaction, tends to be disadvantageously produced. On the other hand, if the reduced viscosity rises in the polymer filter, production of an extraneous matter such as gel and burn deposit emerges. Therefore, B/A≤1.0 is preferred.

In addition, for stabilizing the amount of the polycarbonate resin fed to the filter, a gear pump is preferably disposed between the extruder and the filter. The kind of the gear pump is not limited, but, among others, a self-circulation type not using a gland packing in the sealed part is preferred from the standpoint of reducing the extraneous matter.

In the present invention, the strand formation and pelletization, at which the polycarbonate resin comes into direct contact with outside air, are preferably performed in a clean room having a cleanliness defined in JIS B 9920 (2002) of higher than class 7, more preferably higher than class 6.

The polycarbonate resin subjected to devolatilization and mixing in the extruder and depending on the case, filtration through the filter is cooled/solidified and pelletized by a rotary cutter or the like, and at the time of pelletization, a cooling method such as air cooling and water cooling is preferably used. As for the air used in air cooling, an air after an airborne extraneous matter is previously removed through a hepafilter or the like is preferably used so as to prevent reattachment of an airborne extraneous matter. In the case of employing water cooling, water after a metallic matter in the water is removed by using an ion-exchange resin or the like and furthermore, an extraneous matter in the water is removed through the above-described filter, is preferably used. The opening size of the filter used is preferably from 10 to 0.45 μm in terms of filtration accuracy for 99.9% rejection.

(Filtration Before Polymerization)

On the other hand, in the method of the present invention, for more reducing an extraneous matter contained in the finally obtained polycarbonate resin, it is also effective to filter the raw material monomer through a raw material barrier filter before performing the polycondensation reaction.

The shape of the raw material barrier filter may be of any type such as basket type, disc type, leaf disc type, tube type, flat cylinder type and pleated cylinder type but, among others, is preferably a pleated type that is compact and capable of providing for a large filtration area. Also, the filter element constituting the raw material barrier filter may be any of a metal winding, a laminated metal mesh, a metallic nonwoven fabric, a porous metal sheet and the like, but in view of filtration accuracy, a laminated metal mesh or a metallic nonwoven fabric is preferred, and a filter element of a type where a metallic nonwoven fabric is fixed by sintering, is more preferred.

The material for the raw material barrier filter is not particularly limited and, for example, a metal-made filter, a resin-made filter or a ceramic-made filter may be used, but in view of heat resistance or reduced coloration, a metal-made filter having an iron content of 80% or less is preferred, and a filter made of a stainless steel such as SUS304, SUS316, SUS316L and SUS310S is more preferred.

At the filtration of the raw material monomer, a plurality of filter units are preferably used so as to extend the life of the raw material barrier filter while ensuring the filter performance. In particular, assuming that the opening size of the filter in a unit on the upstream side is C μm and the opening size of the filter in a unit on the downstream side is D μm, C is preferably larger than D (C>D) in at least one combination of filter units. When this condition is satisfied, the raw material barrier filter is less likely to clog and the exchange frequency of the raw material barrier filter can be reduced.

The opening size of the raw material barrier filter is not particularly limited but, in at least one raw material barrier filter, the opening size is preferably 10 μm or less in terms of 99.9% filtration accuracy. In the case where a plurality of filter units constituting the raw material barrier filter are disposed, the opening size is preferably 8 μm or more, more preferably 10 μm or more, on the most upstream side, and is preferably 2 μm or less, more preferably 1 μm or less, on the most downstream side. Incidentally, the opening size of the raw material barrier filter as used herein is also determined in accordance with ISO 16889 described above.

In the present invention, the temperature of the raw material fluid at the time of passing a raw material through the raw material barrier filter is not limited, but if the temperature is too low, the raw material may be solidified, whereas if the temperature is too high, there may occur a trouble such thermal decomposition. Therefore, the temperature is usually from 100 to 200° C., preferably from 100 to 150° C.

In the present invention, any raw material out of a plurality of kinds of raw materials used may be filtered or all raw materials may be filtered. The method therefor is not limited, and a raw material mixture of a dihydroxy compound and a carbonic acid diester may be filtered, or these raw materials may be separately filtered and then mixed. Also, in the production method of the present invention, a reaction solution may be filtered halfway through the polycondensation reaction by the same filter as the raw material barrier filter.

(Polycarbonate Resin Obtained)

The glass transition temperature of the polycarbonate resin obtained by the method of the present invention is, as described above, substantially the same as the glass transition temperature of the polycarbonate resin fed to the extruder and is preferably 80° C. or more, more preferably 85° C. or more, still more preferably 90° C. or more, and on the other hand, preferably less than 145° C., more preferably 140° C. or less, still more preferably 135° C. or less.

The yellow index value of the polycarbonate resin obtained by the method of the present invention is preferably 70 or less, more preferably 30 or less, still more preferably 15 or less, and most preferably 10 or less. For reducing the yellow index value, as described above, the monomer preparation conditions, the polymerization reaction conditions, the filtration conditions, the extrusion conditions, the screw element, the heat stabilizer, the release agent and the like must be appropriately selected.

Also, the molecular weight of the polycarbonate resin obtained by the method of the present invention can be expressed by the reduced viscosity ($\eta_{sp}/c$). The reduced viscosity is usually 0.3 dL/g or more, preferably 0.35 dL/g or more, more preferably 0.4 dL/g or more, and the upper limit of the reduced viscosity is usually 1.2 dL/g or less, preferably 0.8 dL/g or less, more preferably 0.7 dL/g or less. If the reduced viscosity is too low, the mechanical strength of the molded article may be low and in the case of performing a stretching operation after forming into a film, stretch breaking may be caused. On the other hand, if the reduced viscosity is too high, not only flowability at the molding tends to decrease, leading to reduction in the productivity and moldability, but also serious deterioration may occur due to shear heat generation during filtration or extrusion. Incidentally, the reduced viscosity is determined by precisely weighing the polycarbonate resin pellet, preparing a solution precisely adjusted to 0.6 g/dL with use of methylene chloride as a solvent, and measuring the viscosity by means of an Ubbelohde viscosity tube at a temperature of 20.0° C.±0.1° C.

The melt viscosity of the polycarbonate resin obtained by the method of the present invention as measured at 240° C. and a shear rate of 91.2 sec$^{-1}$ is usually 500 Pa·s or more, preferably 800 Pa·s or more, more preferably 1,000 Pa·s or more, and the upper limit thereof is usually 3,000 Pa·s or less, preferably 2,000 Pa·s or less, more preferably 1,500 Pa·s or less. If the melt viscosity is too low, the mechanical strength of the molded article tends to be poor, whereas if the melt viscosity is too high, as described above, the shear heat generation in the filter or extruder may be increased to cause serious deterioration during filtration or extrusion. Incidentally, the melt viscosity is changed not only by the molecular weight but also by the molecular structure and therefore, it is important to control the melt viscosity to fall in the range above by selecting the molecular weight and the molecular structure according to the performance required.

The concentration of the terminal group represented by the following structural formula (11) in the polycarbonate resin obtained by the present invention is preferably 20 µeq/g or more, more preferably 40 µeq/g or more, still more preferably 50 µeq/g or more. If the concentration of the terminal group is too low, coloration tends to increase in intensity during filtration, whereas if the concentration is too high, gas evolution is likely to occur during filtration and a trouble such as gas cutting of a strand may be caused. Therefore, the concentration is preferably 200 µeq/g or less, more preferably 150 µeq/g or less, still more preferably 100 µeq/g or less.

[Chem. 8]

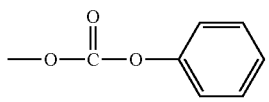

(11)

The method for controlling the concentration of the terminal group represented by formula (11) includes a method of controlling the molar ratio of raw materials, that is, dihydroxy compounds containing the dihydroxy compound of the present invention and a carbonic acid diester, and a method of controlling, for example, the polymerization pressure or polymerization temperature at the transesterification reaction or the temperature of the reflux condenser, according to ease of volatilization of the monomer. Among others, use of a reactor having a reflux condenser in the initial polymerization stage is effective for stabilizing the concentration of the terminal group above.

In the transesterification reaction performed in the present invention, when the polycarbonate resin of the present invention is produced using, as the carbonic acid diester represented by formula (4), diphenyl carbonate or a substituted diphenyl carbonate such as ditolyl carbonate, an aromatic monohydroxy compound such as phenol and substituted phenol is unavoidably produced as a by-product and remains in the polycarbonate resin. These compounds may give rise to gas evolution during filtration or an odor at the molding and therefore, the content thereof is preferably reduced to less than 0.1 wt %, more preferably less than 0.05 wt %, still more preferably less than 0.03 wt %, by using an extruder with a vacuum vent. However, it is difficult in industry to completely remove these compounds, and the lower limit of the content of the aromatic monohydroxy compound is usually 0.0001 wt %.

Incidentally, such an aromatic monohydroxy compound may of course have a substituent depending on the raw material used and, for example, may have an alkyl group having a carbon number of 5 or less. In the case of using diphenyl carbonate as the carbonic acid diester, the aromatic monohydroxy compound is phenol.

The polycarbonate resin obtained by the method of the present invention can be formed into a molded matter by a commonly known method such as injection molding method, extrusion molding method and compression molding method. If desired, an additive such as heat stabilizer, neutralizer, ultraviolet absorber, release agent, coloring agent, antistatic agent, slip agent, lubricant, plasticizer, compatibilizer and flame retardant can be kneaded with the polycarbonate resin in the above-described extruder. Alternatively, these additives may be mixed using a tumbler, a super-mixer, a floater, a V-blender, a Nauta mixer, a Banbury mixer, another extruder or the like.

A less-colored polycarbonate resin reduced in the extraneous matter is stably obtained by the method of the present invention, so that the number of extraneous matters of 25 µm or more contained in a film formed with a thickness of 35 µm±5 µm by using the resin can be reduced to preferably 1,000 pieces/m$^2$ or less, more preferably 500 pieces/m$^2$ or less, still more preferably 400 pieces/m$^2$ or less, and most preferably 200 pieces/m$^2$ or less. This feature of the extraneous matter being reduced is advantageous particularly when using the polycarbonate resin for optical applications. The thickness of the film obtained by forming the polycarbonate resin of the present invention is not particularly limited and varies according to use but is usually on the order of 20 to 200 µm.

The polycarbonate resin obtained by the method of the present invention may be also used as a polymer alloy by kneading it with, for example, one member or two or more members of a synthetic resin such as aromatic polycarbonate resin, aromatic polyester, aliphatic polyester, polyamide, polystyrene, polyolefin, acrylic resin, amorphous polyolefin ABS and AS, a biodegradable resin such as polylactic acid and polybutylene succinate, and rubber.

According to the present invention, a polycarbonate resin excellent in the thermal stability, hue and mechanical strength and less contaminated with an extraneous matter can be provided. Incidentally, in producing a polycarbonate resin film, the film can be produced not only by using a polycarbonate resin pellet after once producing the pellet through the above-described procedure but also by forming the resin into a film without passing through a pellet state.

EXAMPLES

The present invention is described in greater detail below by referring to Examples, but the present invention is not limited to these Examples as long as the purport thereof is observed. In the following, the evaluations of physical properties or characteristics of the polycarbonate were performed by the methods described below.

(1) Measurement of Oxygen Concentration

The oxygen concentration in the polymerization reaction apparatus was measured using an oxygen meter (1000RS, manufactured by AMI).

(2) Measurement of Reduced Viscosity

A polycarbonate resin solution having a concentration of 0.6 g/dL was prepared from a polycarbonate resin pellet by using methylene chloride as a solvent and measured at a temperature of 20.0° C.±0.1° C. by using an Ubbelohde viscosity tube manufactured by Moritomo Rika Kogyo, and the relative viscosity $\eta_{rel}$ was determined from the flow-through time $t_0$ of the solvent and the flow-through time t of the solution according to the following formula:

$$\eta_{rel} = t/t_0$$

The specific viscosity $\eta_{sp}$ was determined from the relative viscosity according to the following formula:

$$\eta_{sp} = (\eta_{rel} - \eta_0)/\eta_0 = \eta_{rel} - 1$$

The reduced viscosity $\eta_{sp}/c$ was determined by dividing the specific viscosity by the concentration c (g/dL). A higher value indicates a larger molecular weight.

(3) Measurement of Concentration of Terminal Phenyl Group and Concentration of Terminal Double Bond About 30 mg of a polycarbonate resin pellet was weighed and dissolved in about 0.7 mL of deuterated chloroform to obtain a solution and after adding a known amount of 1,1,2,2-tetrabromoethane as an internal reference, the solution was put in a tube for NMR having an inner diameter of 5 mm and measured for $^1$H NMR spectrum at ordinary temperature by using JNM-AL400 (resonance frequency: 400 MHz) manufactured by JEOL Ltd. The concentration was determined from the intensity ratio of signals based on the internal reference, terminal phenyl group and terminal double bond.

Then, 30 mg of polycarbonate was weighed and dissolved in about 0.7 mL of deuterated chloroform, and this solution was put in a tube for NMR having an inner diameter of 5 mm and measured for $^1$H NMR spectrum. The amounts of terminal phenyl group, terminal hydroxy group and terminal double bond were determined from the intensity ratio of signals based on respective terminal groups and structural units derived from respective dihydroxy compounds. The apparatus and conditions used are as follows.

Apparatus: JNM-AL400 (resonance frequency, 400 MHz), manufactured by JEOL Ltd.
Measurement temperature: ordinary temperature
Relaxation time: 6 seconds
Number of integrations: 512

The analysis of $^1$H NMR in the case of a copolymerized carbonate of ISB and CHDM exemplified in the present invention is performed as follows. The integrated value of the following peaks is calculated.

(a): 5.6-4.8 ppm: derived from all ISB structural units (proton number: 3, molecular weight: 172.14)

(b): 2.2-0.5 ppm: derived from all CHDM structural units (proton number: 10, molecular weight: 170.21)

(c): 4.4 ppm: derived from terminal hydroxy group of ISB (proton number: 1, molecular weight: 173.14)

(d): 3.6-3.5 ppm: derived from terminal hydroxy group of ISB (proton number: 1, molecular weight: 173.14) and derived from terminal hydroxy group of CHDM (proton number: 2, molecular weight: 171.21)

(e): 3.5-3.4 ppm: derived from terminal hydroxy group of CHDM (proton number: 2, molecular weight: 171.21) and derived from terminal double bond of ISB (proton number: 1, molecular weight: 155.13)

(f): 2.6 ppm: derived from terminal hydroxy group of ISB (proton number: 1, molecular weight: 173.14)

(g): 6.7-6.5 ppm: derived from terminal double bond of ISB (proton number: 1, molecular weight: 155.13)

(h): 2.3 ppm: derived from terminal double bond of CHDM (proton number: 2, molecular weight: 153.20)

(i): 7.5-7.3 ppm: derived from terminal phenyl group (proton number: 2, molecular weight: 93.10)

<Value Corresponding to Molar Number of Each Structure>
All ISB Structural Units:
　(a) integrated value/3=(a')
All CHDM Structural Units:
　(b) integrated value/10=(b')
Terminal Hydroxy Group of ISB:
　(c) integrated value+(f) integrated value=(c')
Terminal Hydroxy Group of CHDM:
　{(d) integrated value−(f) integrated value}/2+{(e) integrated value−(g) integrated value}/2=(d')
Terminal Double Bond of ISB:
　(g) integrated value=(e')
Terminal Double Bond of CHDM:
　(h) integrated value/2=(f')
Terminal Phenyl Group:
　(i) integrated value/2=(g')<
<Amount of Each Terminal Group (Unit: μEq/g)>
Amount of Terminal Hydroxy Group of ISB:
　(c')/(i')×1,000,000
Amount of Terminal Hydroxy Group of CHDM:
　(δ')/(i')×1,000,000
Amount of Terminal Double Bond of ISB:
　(e')/(i')×1,000,000
Amount of Terminal Double Bond of CHDM:
　(f')/(i')×1,000,000
Amount of Terminal Phenyl Group:
　(g')/(i')×1,000,000
　Here, (i')=(a')×172.14+(b')×170.21.

(4) Measurement of Phenol Content and DPC Content

About 1.25 g of polycarbonate resin pellet was precisely weighed and dissolved in 7 ml of methylene chloride to prepare a solution, and the solution was subjected to a reprecipitation treatment by adding acetone to make a total amount of 25 ml. Subsequently, the treated solution was filtered through a 0.2 μm disc filter and quantitatively determined by liquid chromatography.

(5) Measurement of Glass Transition Temperature

A differential scanning calorimeter (DSC 6220, manufactured by SII Nano Technology) was used. About 10 mg of a polycarbonate resin pellet cut into an appropriate size was placed in an aluminum pan manufactured by the same company and after sealing the pan, the temperature was raised at a temperature rise rate of 20° C./min from room temperature to 250° C. under a nitrogen stream at 50 mL/min. The temperature was held for 3 minutes and thereafter, the sample was cooled to 30° C. at a rate of 20° C./min and held at 30° C. for 3 minutes. Subsequently, the temperature was again raised at a rate of 20° C./min to 200° C., and an extrapolated glass transition initiation temperature was determined from DSC data obtained in the second temperature rise.

(6) Hue of Polycarbonate Resin Pellet

A 1 cm cell was packed with resin pellets obtained. The yellow index (YI) value in reflected light was measured three times by using a color tester (CM-3700d, manufactured by Konica Minolta Inc.), and an average value was calculated. A smaller YI value indicates a lesser yellow tint and a higher quality.

(7) Quantitative Determination of Extraneous Matter in Polycarbonate Resin Pellet Temperatures of barrels of a 20 mm-diameter single-shaft extrude with a T-die were set to 210° C., 220° C., 230° C., 230° C. and 220° C. from the pellet feed side, and a film having a thickness of 35 µm±5 µm was formed using a cooling roll and measured for the number of extraneous matters of 25 µm or more per 1 m² by using Film Quality Testing System (Model FSA100) manufactured by Optical Control System.

(8) Evaluation of Injection Molding

A polycarbonate resin pellet was dried at a temperature lower by 20° C. than the glass transition temperature for 24 hours in a nitrogen atmosphere. The dried polycarbonate resin pellet was fed to an injection molding machine (Model J75EII, manufactured by The Japan Steel Works, Ltd.), and an injection molded piece (60 mm (width)×60 mm (length)×3 mm (thickness)) was formed at a resin temperature of 220 to 230° C.

(9) Warm Water Immersion Test

The injection molded article obtained in (7) above was immersed in warm water at 80° C. for 6 hours, and the behavior was observed.

(10) Measurement of Melt Viscosity (Pass)

A sample dried at 120° C. for 6 hours was heated at a constant temperature and measured at a shear rate γ between 9.12 and 1,824 (sec$^{-1}$) by using a capillary rheometer (manufactured by Toyo Seiki Ltd.) with a die of 1 mm φ×10 mm L, and the melt viscosity at 91.2 sec$^{-1}$ was read.

Abbreviations of compounds used in Examples are as follows.

ISB: Isosorbide (trade name: POLYSORB, produced by Roquette Frères)

CHDM: 1,4-Cyclohexanedimethanol (trade name: SKY CHDM, produced by New Japan Chemical Co., Ltd.)

1,6-HD: 1,6-Hexanediol (produced by BASF)

DPC: Diphenyl carbonate (produced by Mitsubishi Chemical Corp.)

Incidentally, detailed conditions of Examples 1 to 10 and Comparative Examples 1 and 2 are shown in Table 1.

Example 1

Raw materials prepared to give a molar ratio of ISB/CHDM/DPC of 50/50/100 in a raw material preparation tank thoroughly purged with nitrogen (oxygen concentration: from 0.0005 to 0.001 vol %) were continuously fed in given amounts to a first polymerization reactor equipped with a heating medium jacket using oil as a heating medium, an internal coil in the heating medium, a stirring blade, a distillation tube connected to a vacuum pump, and a condenser, and at the same time, a calcium acetate monohydrate in the form of an aqueous solution was continuously fed from a catalyst feed line connected to a raw material feed line to account for 1.25×10$^{-6}$ mol (in terms of atom of calcium metal) per 1 mol of all dihydroxy compounds. The raw materials and the aqueous catalyst solution were mixed in the line and thereafter, two raw material barrier filters of a pleated cylinder type were provided in the flow path before entering the first reactor. The opening size of the raw material barrier filter on the upstream sides was set to 10 µm, and the opening size on the downstream side was set to 1 µm. In the distillation tube of the first polymerization reactor, a reflux condenser using oil (inlet temperature: 130° C.) as a refrigerant was disposed and furthermore, a condenser using warm water (inlet temperature: 45° C.) as a refrigerant was disposed between the reflux condenser and the vacuum pump so as to condense phenol and the like that had not been condensed by the reflux condenser. While keeping the rotation speed of the stirring blade of the first polymerization reactor constant, the reactor was controlled to consistently keep an internal temperature of 185° C., a pressure of 25 kPa and a residence time of 1.5 hours, and the reaction solution was continuously withdrawn from the bottom of the reaction tank and fed to a second polymerization reactor. Similarly to the first polymerization reactor, the second polymerization reactor was equipped with a heating medium jacket, an internal coil in the heating medium, a stirring blade, and a distillation tube connected to a vacuum pump, and a reflux condenser and a condenser were disposed in the distillation tube. The reactor was controlled to consistently keep an internal temperature of 213° C., a pressure of 14 kPa and a residence time of 1 hour, and the reaction solution was continuously withdrawn from the bottom of the reaction tank and fed to a third polymerization reactor. The third polymerization reactor was controlled to consistently keep an internal temperature of 229° C., a pressure of 6 kPa and a residence time of 1 hour and while removing successively occurring byproduct phenol, the polycondensation reaction was allowed to proceed. The reaction solution was continuously withdrawn from the bottom of the reaction tank and fed to a horizontal reactor (fourth polymerization reactor) having two horizontal rotation shafts and mutually discontinuous stirring blades attached almost perpendicularly to the horizontal shaft. The fourth polymerization reactor was controlled to have an internal temperature near inlet of 228° C., an internal temperature near outlet of 240° C., a pressure of 0.07 kPa and a residence time of 2 hours, and the polymerization reaction was further allowed to proceed. The obtained polycarbonate resin was continuously fed to a twin-shaft extrude having an additive feed port and three vent openings, where L/D=42 and the length of kneading disk was 6% of the length of elements constituting the entire screw of the extruder (other screw elements of the kneading disk are a full flight and a seal ring). Water in a ratio of 0.1% based on the polycarbonate resin treated was fed into the extruder, and the vent opening was connected to a vacuum pump to remove volatile ingredients contained in the polycarbonate resin. A side feeder was disposed downstream a water feed nozzle and a vent opening continuing from the nozzle, and 0.1 parts by weight of pentaerythrityl tetrakis[3-(3,5-di-t-butyl-4-hydroxyphenyl)propionate] (trade name: IRGANOX 1010), 0.05 parts by weight of tris(2,4-di-t-butylphenol)phosphite (trade name: Adeka Stab 2112), and 0.3 parts by weight of stearic acid monoglyceride (produced by Riken Vitamin Co., Ltd.) were continuously fed per 100 parts by weight of the polycarbonate resin.

The heater temperature of the barrel of the extruder was set to 245° C. in four upstream blocks (C1 to C4) and 225° C. in six downstream blocks (C5 to C10), and the rotation speed of the screw was set to 250. At this time, the polycarbonate resin fed to the extruder was temporarily withdrawn and subjected to temperature measurement and various analyses. The results are shown in Table 1.

The polycarbonate resin treated in the extruder was fed to a filter unit having an inlet for the resin in the lower part and an outlet in the upper part, through a gear pump disposed at the outlet of the extruder. The temperature and various measured values of the resin sampled before the filter unit are shown in Table 1. A leaf disc filter having an opening size of 7 µm (manufactured by Pall Corporation) was fixed inside the filter unit to remove an extraneous matter in the polycarbonate resin. This filter was, before use, subjected to a roasting treatment at 310° C. for 40 hours in a water vapor atmosphere and subsequently at 420° C. for 52 hours in an air atmosphere, then cooled to room temperature, immersed in an aqueous 30 wt % nitric acid solution for 30 minutes to form an oxide film, washed with water and dried. The filter unit was equipped with a heater consisting of a plurality of blocks, and the temperature in each block was set to be from 230 to 240° C. A die was disposed on the outlet side of the filter unit through a polymer line equipped with a heater consisting of a plurality of blocks. The preset temperature of the heater of the polymer line was from 220 to 230° C., and the heater of the die was set to 220° C. The polycarbonate resin was withdrawn in a strand form from the die in a room kept at a cleanliness of class 10000, then solidified in a water bath, and pelletized by a rotary cutter.

The obtained pellet was injection-molded and subjected to a warm water immersion test, as a result, abnormality such as deformation was not observed. The analysis values are shown in Table 1.

Example 2

The production, molding and measurements were performed in the same manner as in Example 1 except that pentaerythrityl tetrakis[3-(3,5-di-t-butyl-4-hydroxyphenyl) propionate] and tris(2,4-di-t-butylphenol)phosphite were not added in Example 1.

Example 3

The production, molding and measurements were performed in the same manner as in Example 1 except that the internal temperature of the first polymerization reactor was set to 194° C., the pressure thereof was set to 27 kPa, the internal temperature of the second polymerization reactor was set to 190° C., the pressure thereof was set to 19 kPa, the internal temperature of the third polymerization reactor was set to 213° C., the pressure thereof was set to 7.5 kPa, the internal temperature near inlet of the fourth polymerization reactor was set to 214° C., the internal temperature near outlet thereof was set to 228° C., the pressure thereof was set to 0.7 kPa, and the heater of the die was set to 230° C.

Example 4

The production, molding and measurements were performed in the same manner as in Example 1 except that the internal temperature of the first polymerization reactor was set to 190° C., the pressure thereof was set to 25 kPa, the internal temperature of the second polymerization reactor was set to 196° C., the pressure thereof was set to 17.7 kPa, the internal temperature of the third polymerization reactor was set to 215° C., the pressure thereof was set to 6.9 kPa, the internal temperature near inlet of the fourth polymerization reactor was set to 218° C., the internal temperature near outlet thereof was set to 232° C., the pressure thereof was set to 0.9 kPa, and the heater temperature of the barrel of the extruder was set to 240° C. in four upstream blocks and 185° C. in six downstream blocks.

Example 5

The production, molding and measurements were performed in the same manner as in Example 1 except that ISB/CHDM/DPC were prepared in the raw material preparation tank to give a molar ratio of 70/30/100, the internal temperature of the first polymerization reactor was set to 188° C., the pressure thereof was set to 24.2 kPa, the internal temperature of the second polymerization reactor was set to 194° C., the pressure thereof was set to 19.9 kPa, the internal temperature of the third polymerization reactor was set to 214° C., the pressure thereof was set to 9.9 kPa, the internal temperature near inlet of the fourth polymerization reactor was set to 218° C., the internal temperature near outlet thereof was set to 232° C., the pressure thereof was set to 0.1 kPa, and the heater temperature of the barrel of the extruder was set to 240° C. in four upstream blocks and 195° C. in six downstream blocks.

Example 6

The production, molding and measurements were performed in the same manner as in Example 3 except that the opening size of the filter was changed to 22 μm. The pressure loss in the polymer filter was reduced, decrease in the molecular weight or increase in the double bond terminal was on the decline, and the color tone of the obtained polycarbonate resin was improved, but the amount of an extraneous matter was increased.

Comparative Example 1

The production, molding and measurements were performed in the same manner as in Example 1 except that the internal temperature of the third polymerization reactor was set to 240° C., the pressure thereof was set to 4 kPa, the internal temperature near inlet of the fourth polymerization reactor was set to 240° C., the internal temperature near outlet thereof was set to 252° C., the pressure thereof was set to 0.02 kPa, the resin feed temperature of the extruder was set to 251° C., the heater temperature of the barrel of the extruder was set to 250° C. in four upstream blocks and 245° C. in six downstream blocks, the rotation speed of the screw was set to 280 rpm, the preset temperature of the heater of the filter unit was from 270 to 280° C., the preset temperature of the heater of the polymer line was from 270 to 280° C., and the heater of the die was set to 280° C. The pressure loss in the polymer filter was on the decline, but the temperature of the polycarbonate resin ejected from the die was 285° C. and the resin was conspicuously colored. Also, gas evolved from the die and strands were disordered, failing in obtaining a pellet.

Example 7

The production, molding and measurements were performed in the same manner as in Example 1 except that ISB/DPC were prepared in the raw material preparation tank to give a molar ratio of 100/100. The glass transition temperature of the obtained polycarbonate resin was 160° C. The YI of the obtained polycarbonate resin pellet was 46 and better than that in Example 2. However, when injection molding was performed using the obtained polycarbonate resin pellet, a crack was caused by a pushing pin for releasing, and a molded article was not obtained. Similarly, a film for quantitative determination of an extraneous matter could not be formed. Also, the film was lacking in toughness, and a film for quantitative determination of an extraneous matter could be hardly formed.

Example 8

The production, molding and measurements were performed in the same manner as in Example 1 except that ISB/1,6-HD/DPC were prepared in the raw material preparation tank to give a molar ratio of 65/35/100. The glass transition temperature of the obtained polycarbonate resin was 77° C. The YI of the obtained polycarbonate resin pellet was 30 and better than that in Example 2. However, when injection molding was performed using the obtained polycarbonate resin pellet, the releasability from the metal mold was bad. Also, when a warm water immersion test was performed, deformation was observed.

Comparative Example 2

The production, molding and measurements were performed in the same manner as in Example 1 except that in Example 1, the internal temperature of the third polymerization reactor was set to 240° C., the pressure thereof was set to 4 kPa, the internal temperature near inlet of the fourth polymerization reactor was set to 240° C., the internal temperature near outlet thereof was set to 252° C., the pressure thereof was set to 0.02 kPa, the resin feed temperature of the extruder was set to 251° C., the heater temperature of the barrel of the extruder was set to 260° C. in four upstream blocks and 250° C. in six downstream blocks, the preset temperature of the heater of the filter unit was from 240 to 250° C., the preset temperature of the heater of the polymer line was from 240 to 250° C., and the heater of the die was set to 240° C. The reduced viscosity was reduced at the inlet of the filter, coloration of the polycarbonate resin was conspicuous, gas evolved from the die to disorder strands, and the loss of pelletization was large.

Example 9

The production, molding and measurements were performed in the same manner as in Example 6 except that the proportion of the kneading element of the extruder was changed to 12%.

Example 10

The production, molding and measurements were performed in the same manner as in Example 9 except that a part of the polycarbonate resin was withdrawn from the line for feeding the polycarbonate resin from the fourth polymerization reactor to the extruder and the amount of the resin fed to the extruder was thereby decreased.

The results of Examples and Comparative Examples are shown in Table 1 below.

TABLE 1

| | | | Example 1 | Example 2 | Example 3 | Example 4 | Example 5 | Example 6 | Comparative Example 1 | Example 7 | Example 8 | Comparative Example 2 | Example 9 | Example 10 |
|---|---|---|---|---|---|---|---|---|---|---|---|---|---|---|
| Monomer composition | ISB | (mol %) | 50 | 50 | 50 | 50 | 70 | 50 | 50 | 100 | 65 | 50 | 50 | 50 |
| | CHDM | (mol %) | 50 | 50 | 50 | 50 | 30 | 50 | 50 | — | — | 50 | 50 | 50 |
| | 1,6-HD | (mol %) | — | — | — | — | — | — | — | — | 35 | — | — | — |
| Heat stabilizer | IRGANOX 1010 | parts by weight/ 100 parts by weight of resin | 0.1 | 0.1 | — | 0.1 | 0.1 | 0.1 | 0.1 | 0.1 | 0.1 | 0.1 | 0.1 | 0.1 |
| | ADEKA STAB 2112 | parts by weight/ 100 parts by weight of resin | 0.05 | — | 0.05 | 0.05 | 0.05 | 0.05 | 0.05 | 0.05 | 0.05 | 0.05 | 0.05 | 0.05 |
| Catalyst | Kind | | CA | CA | CA | CA | CA | CA | CA | CA | CA | CA | CA | CA |
| | Amount used (in terms of metal amount) | μmol/mol of di-hydroxy compound | 1.25 | 1.25 | 1.25 | 1.25 | 1.25 | 1.25 | 1.25 | 1.25 | 1.25 | 1.25 | 1.25 | 1.25 |
| Extruder | Rotation speed | rpm | 250 | 250 | 250 | 220 | 220 | 250 | 280 | 250 | 250 | 250 | 250 | 250 |
| | Proportion of kneading element | % | 6 | 6 | 6 | 6 | 6 | 6 | 6 | 6 | 6 | 6 | 12 | 12 |
| | Amount of resin extruded/cross-section of barrel of extruder | kg/(h · m²) | 31085 | 31085 | 31085 | 31085 | 31085 | 31085 | 31085 | 31085 | 31085 | 31085 | 31085 | 12434 |
| | Preset temperature of heater (C1-C4) | °C. | 245 | 245 | 245 | 240 | 240 | 245 | 250 | 245 | 245 | 260 | 245 | 245 |
| | Preset temperature of heater (C5-C10) | °C. | 225 | 225 | 225 | 185 | 195 | 225 | 245 | 225 | 225 | 250 | 225 | 225 |
| | Resin feed temperature | °C. | 230 | 230 | 230 | 230 | 230 | 230 | 251 | 240 | 240 | 251 | 230 | 230 |
| Filter | Opening size | μm | 7 | 7 | 7 | 7 | 7 | 22 | 7 | 7 | 7 | 7 | 22 | 22 |
| | Resin feed temperature | °C. | 268 | 268 | 271 | 260 | 266 | 271 | 283 | 275 | 260 | 281 | 285 | 288 |
| | Preset temperature of heater | °C. | 230-240 | 230-240 | 230-240 | 230-240 | 230-240 | 230-240 | 270-280 | 230-240 | 230-240 | 240-250 | 230-240 | 230-240 |
| Polymer line | Preset temperature of heater | °C. | 220-230 | 220-230 | 220-230 | 220-230 | 220-230 | 220-230 | 270-280 | 220-230 | 220-230 | 240-250 | 220-230 | 220-230 |
| Die | Preset temperature of heater | °C. | 220 | 220 | 230 | 220 | 220 | 230 | 280 | 220 | 220 | 240 | 230 | 230 |
| | Resin temperature at outlet | °C. | 249 | 249 | 257 | 247 | 251 | 252 | 285 | 265 | 240 | 276 | 274 | 276 |
| Internal volume of filter containment vessel/flow rate of polycarbonate resin | | min | 2.7 | 2.7 | 2.7 | 2.7 | 2.7 | 2.7 | 2.7 | 2.7 | 2.7 | 2.7 | 2.7 | 6.8 |
| Polycarbonate resin at inlet of extruder | $\eta_{sp}/c$ (a) | dL/g | 0.619 | 0.619 | 0.708 | 0.618 | 0.459 | 0.708 | 0.514 | 0.382 | 0.499 | 0.519 | 0.598 | 0.591 |
| | Melt viscosity (240° C., 91.2 sec⁻¹) | Pa · s | 1490 | 1490 | 2265 | 1560 | 1558 | 2265 | 860 | 2826 | 1592 | 852 | 1314 | 1342 |
| | Terminal double bond of ISB | μeq/g | 2.3 | 2.3 | 2.3 | 2.3 | 3.2 | 2.3 | 2.3 | 4.6 | 2.3 | 2.3 | 2.3 | 2.3 |
| | Terminal double bond of CHDM | μeq/g | 8.1 | 8.1 | 8.1 | 8.1 | 4.9 | 8.1 | 8.1 | — | | 8.1 | 8.1 | 8.1 |
| | Total concentration of terminal double bond (X) | μeq/g | 10.4 | 10.4 | 10.4 | 10.4 | 8.08 | 10.4 | 10.4 | 4.6 | | 10.4 | 10.4 | 10.4 |

TABLE 1-continued

| | | Example 1 | Example 2 | Example 3 | Example 4 | Example 5 | Example 6 | Comparative Example 1 | Example 7 | Example 8 | Comparative Example 2 | Example 9 | Example 10 |
|---|---|---|---|---|---|---|---|---|---|---|---|---|---|
| Polycarbonate at inlet of filter (outlet of extruder) | $\eta_{sp}/c$ (A) dL/g | 0.598 | 0.598 | 0.668 | 0.595 | 0.437 | 0.668 | 0.494 | 0.365 | 0.490 | 0.501 | 0.550 | 0.541 |
| | Melt viscosity (240° C., 91.2 sec$^{-1}$) Pa·s | 1160 | 1160 | 1464 | 1188 | 1097 | 1464 | 664 | 1980 | 1395 | 673 | 739 | 727 |
| | Terminal double bond of ISB µeq/g | 10.4 | 10.4 | 5.0 | 4.0 | 3.8 | 5.0 | 21.8 | 17.5 | | 24.0 | 18.2 | 19.0 |
| | Terminal double bond of CHDM µeq/g | 23.0 | 23.0 | 12.2 | 7.9 | 5.0 | 12.2 | 33.2 | — | | 35.2 | 27.8 | 29.3 |
| | Total concentration of terminal double bond (x) µeq/g | 33.4 | 33.4 | 17.2 | 11.9 | 8.8 | 17.2 | 55.0 | 17.5 | | 59.2 | 46.0 | 48.3 |
| Polycarbonate resin at outlet of die | $\eta_{sp}/c$ (B) dL/g | 0.565 | 0.565 | 0.613 | 0.590 | 0.427 | 0.647 | 0.436 | 0.318 | 0.485 | 0.485 | 0.495 | 0.477 |
| | Melt viscosity (240° C., 91.2 sec$^{-1}$) Pa·s | 1090 | 1090 | 1251 | 1171 | 1006 | 1379 | 490 | 1720 | 1382 | 545 | 660 | 636 |
| | B/A | 0.94 | 0.94 | 0.92 | 0.99 | 0.98 | 0.97 | 0.88 | 0.87 | 0.99 | 0.97 | 0.90 | 0.88 |
| | B/a | 0.91 | 0.91 | 0.87 | 0.95 | 0.93 | 0.91 | 0.85 | 0.83 | 0.97 | 0.93 | 0.83 | 0.81 |
| | Terminal double bond of ISB µeq/g | 11.0 | 11.0 | 7.1 | 4.6 | 5.3 | 5.5 | 27.8 | 25.0 | | 26.0 | 23.2 | 24.5 |
| | Terminal double bond of CHDM µeq/g | 24.9 | 24.9 | 17.7 | 8.3 | 5.8 | 17.3 | 38.3 | — | | 37.6 | 33.0 | 34.6 |
| | Total concentration of terminal double bond (Y) µeq/g | 35.9 | 35.9 | 24.8 | 12.9 | 11.1 | 22.8 | 66.0 | 25.0 | | 63.6 | 56.2 | 59.1 |
| | Y-X µeq/g | 25.5 | 25.5 | 14.4 | 2.5 | 3.0 | 12.4 | 55.6 | 20.4 | | 53.2 | 45.8 | 48.7 |
| | Y-x µeq/g | 2.6 | 2.6 | 7.6 | 1.0 | 2.3 | 5.6 | 11.1 | 7.5 | | 4.4 | 10.2 | 10.8 |
| | x-X µeq/g | 23.0 | 23.0 | 6.8 | 1.5 | 0.7 | 6.8 | 44.6 | 12.9 | | 48.8 | 35.6 | 37.9 |
| | Tg °C. | 101 | 101 | 101 | 101 | 122 | 101 | 101 | 160 | 77 | 101 | 101 | 101 |
| | Concentration of terminal phenol group µeq/g | 57 | 57 | 63 | 96 | 170 | 63 | 24 | 124 | | 26 | 55 | 47 |
| | Phenol content ppm by weight | 270 | 264 | 450 | 431 | 295 | 424 | 955 | 231 | | 829 | 855 | 1021 |
| | DPC content ppm by weight | <1 | <1 | <1 | <1 | <1 | <1 | <1 | <1 | | <1 | <1 | <1 |
| | Y1 of pellet — | 35 | 53 | 22 | 7 | 12 | 17 | —(*1) | 46 | 30 | 64 | 29 | 34 |
| | Number of extraneous matters of 25 µm or more pieces/m$^2$ | 383 | 348 | 319 | 267 | 302 | 1597 | — | —(*2) | 273 | 497 | 1760 | 1909 |
| | Frequency of gas cutting of strand times/day | 0.5 | 0.5 | 1 | 0.5 | 0.5 | 0.5 | 10 | 2 | 0.5 | 4 | 4 | 5 |
| | Evaluation of injection molding | NP | NP | NP | NP | NP | NP | — | generation of crack | bad releasability | generation of silver streak defect | NP | generation of silver streak defect |
| | Warm water immersion test | NP | NP | NP | NP | NP | NP | — | — | deformed | NP | NP | NP |

CA: calcium acetate
NP: no problem.
(*1) Pellet could not be obtained.
(*2) Film for evaluation could not be formed.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-077550) filed on Mar. 31, 2011 and Japanese Patent Application (Patent Application No. 2011-077580) filed on Mar. 31, 2011, the contents of which are incorporated herein by way of reference.

EXPLANATIONS OF REFERENCE SIGNS

1a: Raw material (carbonic acid diester) feed port
1b, 1c: Raw material (dihydroxy compound) feed port
1d: Catalyst feed port
2a: Raw material mixing tank
3a: (Anchor-type) stirring blade
4a: Raw material feed pump
4b, 4c, 4d: Gear pump
5a: Raw material barrier filter
6a: First vertical stirring reactor
6b: Second vertical stirring reactor
6c: Third vertical stirring reactor
6d: Fourth horizontal stirring reactor
7a, 7b, 7c: MAXBLEND Blade
7d: Two-shaft spectacle-shaped stirring blade
8a, 8b: Internal heat exchanger
9a, 9b: Reflux condenser
10a, 10b: Reflux tube
11a, 11b, 11c, 11d: Distillation tube
12a, 12b, 12c, 12d: Condenser
13a, 13b, 13c, 13d: Decompressor
14a: Liquid distillate recovery tank
15a: Extruder
15b: (Polymer) filter
15c: Die
16a: Strand cooling tank
16b: Strand cutter
16c: Pneumatic blower
16d: Product hopper
16e: Weigh scale
16f: Product bag (e.g., paper bag, flexible container)

The invention claimed is:

1. A method for producing a polycarbonate resin, comprising performing polycondensation through a transesterification reaction with a catalyst and with a dihydroxy compound and a carbonic acid diester, and continuously feeding the produced polycarbonate resin to an extruder,
wherein
the polycarbonate is not solidified after the polycondensation and before being fed to the extruder,
the dihydroxy compound contains a dihydroxy compound having a moiety represented by the following formula (1) in a part of the structure,
the dihydroxy compound having a moiety represented by the following formula (1) contains a compound having a cyclic ether structure, and
the temperature at the time of feeding the polycarbonate resin to the extruder is from 180° C. to less than 250° C.:

(1)

with the proviso excluding the case where the moiety represented by formula (1) is a part of —CH$_2$—O—H,
wherein a barrel constituting the extruder has a plurality of heaters and all of the heaters are set to a temperature of 100° C. to less than 250° C.

2. The method for producing a polycarbonate resin according to claim 1, wherein the glass transition temperature of the polycarbonate resin obtained via the extruder is from 80° C. to less than 145° C.

3. The method for producing a polycarbonate resin according to claim 1, wherein each of the heaters is set to a temperature not higher than the preset temperature of the heater adjacent to the polycarbonate resin feed side of the extruder.

4. The method for producing a polycarbonate resin according to claim 1, wherein the polycarbonate resin produced by polycondensation through a transesterification reaction is fed in a molten state to the extruder.

5. The method for producing a polycarbonate resin according to claim 1, wherein the extruder comprises a screw and wherein the screw of the extruder is composed of a plurality of elements, at least one of the elements is a kneading disc, and the total length of the kneading disc is 20% or less of the length of the screw as a whole.

6. The method for producing a polycarbonate resin according to claim 1, wherein assuming that the weight of the resin extruded per hour from the extruder is W (kg/h) and the cross-sectional area of the barrel of the extruder is S (m$^2$), the following formula (5) is satisfied:

$$12000 \leq W/S \leq 60000 \quad (5).$$

7. The method for producing a polycarbonate resin according to claim 1, wherein the reduced viscosity ($\eta_{sp}$/c) of the polycarbonate resin obtained via the extruder, as measured in methylene chloride under the conditions of a concentration of 0.6 g/dL and a temperature of 20.0° C.±0.1° C., is from 0.3 to 1.2 dL/g.

8. The method for producing a polycarbonate resin according to claim 1, wherein the glass transition temperature of the polycarbonate resin obtained via the extruder is from 90 to 140° C.

9. The method for producing a polycarbonate resin according to claim 1, wherein the content of an aromatic monohydroxy compound contained in said polycarbonate resin obtained via said extruder is less than 0.1 wt %.

10. The method for producing a polycarbonate resin according to claim 1, wherein the raw material monomers are filtered through a filter for raw material filtration before polycondensation.

11. The method for producing a polycarbonate resin according to claim 1, wherein said extruder kneads a heat stabilizer.

12. The method for producing a polycarbonate resin according to claim 1, wherein said catalyst is a compound of at least one metal selected from the group consisting of metals belonging to Group 2 of the long-form periodic table and lithium.

13. The method for producing a polycarbonate resin according to claim 1, wherein the dihydroxy compound having a moiety represented by formula (1) is isosorbide.

14. The method for producing a polycarbonate resin according to claim 1, wherein an alicyclic dihydroxy compound is further used as said dihydroxy compound.

15. A method for producing a polycarbonate resin pellet, comprising performing polycondensation through a transesterification reaction with a catalyst and with a dihydroxy compound and a carbonic acid diester, and continuously feeding the produced polycarbonate resin to an extruder, wherein
said polycarbonate is not solidified after said polycondensation and before being fed to said extruder
said dihydroxy compound contains at least a dihydroxy compound having a moiety represented by the following formula (1) in a part of the structure, the glass transition temperature of the polycarbonate resin fed to said extruder is from 80° C. to less than 145° C., and the temperature at the time of feeding said polycarbonate resin to said extruder is from 180° C. to less than 250° C.:

  (1)

with the proviso excluding the case where the moiety represented by formula (1) is a part of —CH$_2$—O—H, wherein a barrel constituting the extruder has a plurality of heaters and all of the heaters are set to a temperature of 100° C. to less than 250° C.

16. A method for producing a polycarbonate resin, comprising performing polycondensation through a transesterification reaction with a catalyst and with a dihydroxy compound and a carbonic acid diester as raw material monomers, and continuously feeding the produced polycarbonate resin to an extruder, wherein said polycarbonate is not solidified after said polycondensation and before being fed to said extruder, said dihydroxy compound contains at least a dihydroxy compound having a moiety represented by the following formula (1) in a part of the structure, the dihydroxy compound having a moiety represented by formula (1) is a compound having a cyclic ether structure, the barrel constituting said extruder has a plurality of heaters, and all of the heaters is set to a temperature of 100° C. to less than 250° C.:

  (1)

with the proviso excluding the case where the moiety represented by the formula (1) is a part of —CH$_2$—O—H.

17. The method for producing a polycarbonate resin according to claim 1, wherein the glass transition temperature of the polycarbonate resin fed to said extruder is from 80° C. to less than 145° C., and the glass transition temperature of the polycarbonate resin obtained from said extruder is from 80° C. to less than 145° C.

* * * * *